(12) United States Patent
Shinohara et al.

(10) Patent No.: US 8,692,959 B2
(45) Date of Patent: Apr. 8, 2014

(54) OPTICAL LAYERED BODY, POLARIZER AND IMAGE DISPLAY DEVICE

(71) Applicant: Dai Nippon Printing Co., Ltd., Tokyo (JP)

(72) Inventors: Seiji Shinohara, Tokyo (JP); Seiichi Isojima, Tokyo (JP); Hiroki Nakagawa, Tokyo (JP); Gen Furui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/742,983

(22) Filed: Jan. 16, 2013

(65) Prior Publication Data
US 2013/0194211 A1 Aug. 1, 2013

(30) Foreign Application Priority Data

Jan. 27, 2012 (JP) ................................ 2012-015945
May 31, 2012 (JP) ................................ 2012-125413

(51) Int. Cl.
*G02F 1/1335* (2006.01)
*G02B 5/30* (2006.01)

(52) U.S. Cl.
USPC ....................................... 349/96; 359/483.01

(58) Field of Classification Search
USPC ....................................... 349/96; 359/483.01
See application file for complete search history.

(56) References Cited

U.S. PATENT DOCUMENTS

| 8,139,181 B2* | 3/2012 | Yoshihara et al. ............... 349/96 |
| 8,456,070 B2* | 6/2013 | Itoh et al. ..................... 313/112 |
| 2007/0046865 A1 | 3/2007 | Umeda et al. |
| 2007/0285776 A1* | 12/2007 | Nakamura et al. ............ 359/485 |
| 2008/0145680 A1* | 6/2008 | Kawamoto et al. ........... 428/500 |
| 2009/0251642 A1* | 10/2009 | Nakamura et al. .............. 349/75 |
| 2010/0188749 A1 | 7/2010 | Hirayama et al. |
| 2011/0128477 A1* | 6/2011 | Izaki et al. ....................... 349/96 |
| 2013/0100378 A1 | 4/2013 | Murata et al. |
| 2013/0293824 A1* | 11/2013 | Yoneyama et al. ........... 349/194 |

FOREIGN PATENT DOCUMENTS

| JP | 09-166711 A | 6/1997 |
| JP | 2000-111706 A | 4/2000 |
| JP | 2000-206333 A | 7/2000 |
| JP | 2011-116926 A | 4/2001 |
| JP | 2004-205773 A | 7/2004 |
| JP | 2011-167914 A | 9/2011 |
| JP | 5123507 B2 | 1/2013 |
| TW | 200925674 A | 6/2009 |
| WO | WO-2007023929 A1 | 3/2007 |
| WO | WO-2011/162198 A1 | 12/2011 |

* cited by examiner

*Primary Examiner* — Alexander S Beck
*Assistant Examiner* — Ibrahim Khan
(74) *Attorney, Agent, or Firm* — Novak Druce Connolly Bove + Quigg LLP

(57) ABSTRACT

Provided is an optical layered body that includes a polyester base, a primer layer formed thereon, and a hard coat layer formed on the primer. The polyester has a retardation of not less than 8000 nm, and a difference (nx−ny) of 0.07 to 0.20 between a refractive index (nx) in a slow axis direction that is a high refractive index direction and a refractive index (ny) of a fast axis direction that is orthogonal to the slow axis direction, a refractive index (np) of the primer, the refractive index (nx) in the slow axis direction of the polyester, and the refractive index (ny) in the fast axis direction of the polyester satisfy ny<np<nx, and a refractive index (nh) of the hard coat, the refractive index (nx) in the slow axis direction of the polyester, and the refractive index (ny) in the fast axis direction of the polyester satisfy ny<nh<nx.

20 Claims, 3 Drawing Sheets

OPTICAL LAYERED BODY, POLARIZER AND IMAGE DISPLAY DEVICE

CROSS REFERENCE TO RELATED APPLICATIONS

This application claims priority to Application No. 2012-015945 filed in Japan on Jan. 27, 2012, and Application No. 2012-125413 filed in Japan on May 31, 2012 under 35 U.S.C. §119; the entire contents of all are hereby incorporated by reference.

TECHNICAL FIELD

The present invention relates to an optical layered body, a polarizer, and an image display device.

BACKGROUND ART

An image display devices such as a liquid crystal display (LCD), a plasma display (PDP), an electroluminescent display (OELD or IELD), a field emission display (FED), a touch panel, and an electronic paper, has an optical layered body including a polarizing device provided on a display screen side of an image display panel, and an antireflective topmost surface with hard coatings.

Films formed of cellulose esters such as triacetyl cellulose have been conventionally used as light transmissive bases of such optical layered bodies. Cellulose esters hardly influence the display quality of image display devices because of their low retardation values and have appropriate permeability. Accordingly, such a use is based on an advantage that moistures left in a polarizing device in the production of a polarizer formed of an optical layered body can be dried through the optical layered body. In addition, comparative inexpensiveness of cellulose ester films also contributes to the use.

Cellulose ester films, however, have poor heat and humidity resistance. Use of a hard coating film as a polarizer protective film in a high-temperature and high-humidity environment problematically lowers performances of a polarizer such as polarization and hue control.

To solve such problems of cellulose ester films, use of a general-purpose film that is commercially available or easily produced by a simple method, as a base of an optical layered body has been desired. For example, use of polyester films such as polyethylene terephthalate films, instead of cellulose ester films, is now considered (see Patent Literature 1).

CITATION LIST

Patent Literature

Patent Literature 1: JP-A 2004-205773

SUMMARY OF INVENTION

Technical Problem

Studies made by the present inventors, however, clarified a problem that arrangement of a polyester film such as a polyethylene terephthalate (PET) film as an alternative of a cellulose ester film on a polarizing element causes unevenness in colors (hereinafter, also referred to as "rainbow interference pattern") in a liquid crystal display device, especially in an oblique view of a display screen, resulting in lowered display quality of the liquid crystal display device.

The present inventors have made further investigations to solve such a problem occurring in the case of using a polyester film to find out the following solution. That is, use of a polyester film having a reasonably high retardation value as a light transmissive base of an optical layered body reduces the problem of rainbow interference pattern, compared to the case of using an optical layered body including a light transmissive base formed of a conventional polyester film.

In the case of using a polyester film having a reasonably high retardation value as a light transmissive base, a primer layer is needed for securing adhesion with a hard coat layer. In an optical layered body having such a configuration, however, interference fringes problematically occurs to significantly lower the display quality of the image display device.

The present invention has been devised in consideration of the state of the art, and aims to provide an optical layered body that has a polyester base and a hard coat layer excellent in adhesiveness with each other and highly suppresses occurrence of rainbow interference pattern and interference fringes in images displayed on a liquid crystal display device, and a polarizer and an image display device each including the optical layered body.

Solution to Problem

The first aspect of the present invention is an optical layered body including: a polyester base, a primer layer formed on the polyester base, and a hard coat layer formed on the primer layer, wherein the polyester base has a retardation of not less than 8000 nm, and a difference (nx−ny) of 0.07 to 0.20 between a refractive index (nx) in a slow axis direction that is a high refractive index direction and a refractive index (ny) of a fast axis direction that is orthogonal to the slow axis direction, a refractive index (np) of the primer layer, the refractive index (nx) in the slow axis direction of the polyester base, and the refractive index (ny) in the fast axis direction of the polyester base satisfy ny<np<nx, and a refractive index (nh) of the hard coat layer, the refractive index (nx) in the slow axis direction of the polyester base, and the refractive index (ny) in the fast axis direction of the polyester base satisfy ny<nh<nx.

The second aspect of the present invention is an optical layered body comprising: a polyester base; a primer layer formed on the polyester base; and a hard coat layer formed on the primer layer, wherein the polyester base has a retardation of not less than 8000 nm, and a difference (nx−ny) of 0.07 to 0.20 between a refractive index (nx) in a slow axis direction that is a high refractive index direction and a refractive index (ny) of a fast axis direction that is orthogonal to the slow axis direction, the primer layer has a thickness of 3 to 30 nm, a refractive index (nh) of the hard coat layer, the refractive index (nx) in the slow axis direction of the polyester base, and the refractive index (ny) in the fast axis direction of the polyester base satisfy ny<nh<nx.

In the optical layered body of the second aspect of the present invention, the refractive index (ny) in the fast axis direction of the polyester base and a refractive index (np) of the primer layer preferably satisfy ny>np. A difference (ny−np) between the refractive index (ny) in the fast axis direction of the polyester base and the refractive index (np) of the primer layer is preferably not more than 0.05. A difference (nx−nh) between the refractive index (nx) in the slow axis direction of the polyester base and the refractive index (nh) of the hard coat layer and a difference (nh−ny) of the refractive index (nh) of the hard coat layer and the refractive index (ny) in the fast axis direction of the polyester base are both preferably not less than 0.025.

In the optical layered bodies of the first aspect and the second aspect of the present invention, the primer layer and the hard coat layer are preferably formed on both surfaces of the polyester base.

The present invention also provides a polarizer including a polarizing element, wherein the polarizer further includes the optical layered body of the first or second aspect of the present invention, on a surface of the polarizing element.

The present invention also provides an image display device including the optical layered body of the first or second aspect of the present invention, or the polarizer of the present invention.

The present invention further provides a touch panel including the optical layered body of the first or second aspect of the present invention, wherein an invisible electrode is provided on a surface of the hard coat layer of the optical layered body on a side opposite the side covered with the primer layer. The present invention further provides a touch panel including the optical layered body, wherein an invisible electrode is provided on at least one hard coat layer of the optical layered body on a side opposite the side covered with the primer layer.

Hereinafter, the present invention is specifically described.

Additionally, in the present invention, unless otherwise specified, curable resin precursors such as monomers, oligomers and prepolymers are referred to as "resin".

In addition, the refractive index and the film thickness of the primer layer and the hard coat layer herein refer to the refractive index and the film thickness thereof as cured films.

The present inventors have intensively studied about the above conventional problems to find out that use of a polyester base with a specific retardation value in an optical layered body including a primer layer between the polyester base and a hard coat layer suppresses occurrence of rainbow interference pattern in displayed images. In addition, based on the following knowledge, they found out that the occurrence of interference fringes can be also suppressed. In this manner, they completed the present invention including an optical layered body according to the first aspect of the present invention and an optical layered body according to the second aspect of the present invention.

The present inventors have found out that the interference fringes occurring in an optical layered body including a stack of a polyester base, a primer layer, and a hard coat layer include an interference fringe caused by interference between light reflected on an interface of the polyester base and the primer layer and light reflected on an interface of the primer layer and the hard coat layer, an interference fringe caused by interference between light reflected on the interface of the primer layer and the hard coat layer and light reflected on a surface of the hard coat layer, and an interference fringe caused by interference between light reflected on the interface of the polyester base and the primer layer and light reflected on the surface of the hard coat layer.

The interference fringes occur also in the case where a difference in the refractive index is present among the polyester base, the primer layer, and the hard coat layer. In addition, uneven thickness of the primer layer influences the occurrence of the interference fringes, though the reason for this is not known.

The present inventors have found out that highly precise control of the refractive indexes of the primer layer and the hard coat layer virtually eliminates the difference in the refractive index among the primer layer, the polyester base, and the hard coat layer so as to sufficiently suppress occurrence of the above interference fringes. In this manner, an optical layered body of the first aspect of the present invention was completed.

The primer layer is commonly formed by application of a composition for a primer layer containing a predetermined material. Completely uniform application of the composition for a primer layer has been technically difficult. Accordingly, uneven application of the composition for a primer layer has been unavoidable to some extent, so that the problem of uneven thickness of the formed primer layer could not be completely solved. As a result of the further intensive studies, the present inventors have found out that an extremely thin primer layer leads to very small unevenness in thickness so that visible interference fringes presumably caused by uneven thickness of the primer layer do not occur. In addition, highly precise control of the refractive index of the hard coat layer virtually eliminates the difference in the refractive index between the polyester base and the hard coat layer so as to solve the problem of the above interference fringes. In this manner, an optical layered body of the second aspect of the present invention was completed.

In the following, a commonality between the optical layered body of the first aspect of the present invention and the optical layered body of the second aspect of the present invention is collectively described as a matter concerning the optical layered body of the present invention.

FIG. 1 is a cross-sectional view schematically illustrating one example of the optical layered body of the present invention.

As illustrated in FIG. 1, an optical layered body 10 of the present invention has a polyester base 11, primer layer 12 formed on the polyester base 11, a hard coat layer 13 formed on the primer layer 12.

In the optical layered body having such a configuration of the present invention, the polystyrene base has a retardation of not less than 8000 nm. The retardation of less than 8000 nm causes rainbow interference pattern in images displayed on a liquid crystal display device including the optical layered body of the present invention. The upper limit of the retardation of the polyester base is not particularly limited, and is preferably about 30,000 nm. The retardation of more than 30,000 nm is not preferable because the effect in avoiding the rainbow interference pattern is not any more obtained and the film becomes considerably thick.

From the standpoint of avoiding the rainbow interference pattern and forming a thin film, the polyester base preferably has a retardation of 10,000 to 20,000 nm.

The retardation is represented by the following equation:

$$\text{Retardation } (Re) = (nx - ny) \times d,$$

wherein nx indicates a refractive index in a direction (slow axis direction) in which the refractive index is largest in a plane of the polyester base, ny indicates a refractive index in a direction (fast axis direction) orthogonal to the slow axis direction, and d indicates a thickness of the polyester base.

The retardation is determined (measured angle of 0°, measuring wavelength of 548.2 nm) by using, for example, KOBRA-WR produced by Oji Scientific Instruments.

It can also be determined using two polarizers by measuring the orientation axis direction (main axis direction) of the polyester substrate and measuring refractive indexes (nx, ny) in two axes orthogonal to the orientation axis direction by an Abbe's refractometer (ATAGO CO., LTD., NAR-4T). The axis having a larger refractive index is defined as a slow axis. The thickness d (nm) of the polyester base is measured by using an electric micrometer (Anritsu Corporation) and the measurement value is converted to the unit of nm. The retardation can be calculated based on a product of the difference in the refractive index (nx−ny) and the thickness d of the film (nm).

The value of the refractive index (n) is obtained by the following method. Namely, the average reflectance (R) in a wavelength range of 380 to 780 nm is measured by using a spectro photometer (UV-3100PC produced by Shimazu Corporation), and the obtained average reflectance (R) is substituted into the following equation:

$$R (\%)=(1-n)^2/(1+n)^2.$$

The average reflectance (R) of the primer layer and of the hard coat layer is measured as follows. The material compositions thereof are each applied to a 50 μm PET without being subjected to a treatment for easy adhesion, to form a cured film with a thickness of 1 to 3 μm. To the face (backside) of the PET without being subjected to application, a black vinyl tape (e.g. Yamato vinyl tape No. 200-38-21, 38-mm width) with a width larger than a spot area for measurement is attached for preventing back surface reflection. Then, the average reflectance of each coating film is measured. Similarly, prior to measurement of the refractive index of the polyester base, a black vinyl tape is attached to the backside face of the measurement face.

To determine the refractive indexes of the primer layer and the hard coat layer after formed into an optical layered body, the cured film of each layer is filed with a cutter or the like to give a powdery sample, and the sample was subjected to the Becke method in accordance with B method of JIS K 7142 (2008) (for determining the refractive index of powdered or granulated transparent material). In the Becke method, a cargille reagent having a known refractive index was dripped onto the powdery sample placed on a glass slide or the like so that the sample is immersed with the reagent. The immersion state was observed with a microscope. The refractive index of the reagent at which the Becke line (a blight line generated along the outline of the sample due to the difference in the refractive index between the sample and the reagent) is not visible is determined as the refractive index of the sample. In the case of the polyester base, the average reflectance is preferably determined by attachment of the black vinyl tape to the treatment surface of the primer layer or the hard coat layer, not by the Becke method.

In the present invention, the "nx−ny" (hereinafter, also referred to as Δn) is 0.07 to 0.20. The Δn of less than 0.07 may fail to provide sufficient effect of suppressing rainbow interference pattern. In addition, the film thickness required for obtaining the retardation value becomes great. The Δn of more than 0.20 may make the polyester base easily cracked or broken to lower the practical utility of the base as an industrial material.

The preferable lower limit of the Δn is 0.08 and the preferable upper limit thereof is 0.15. The Δn of more than 0.15 may lower the durability of the polyester base in the test for determining the resistance to moist heat. From the standpoint of excellent durability in the test for determining the resistance to moist heat, the more preferable upper limit of the Δn is 0.12.

The (nx) is preferably 1.67 to 1.78. The lower limit thereof is more preferably 1.69 and the upper limit thereof is more preferably 1.73. The (ny) is preferably 1.55 to 1.65. The lower limit thereof is more preferably 1.57 and the upper limit thereof is more preferably 1.62.

When the nx and ny are within the above range and satisfy the relation of the Δn, rainbow interference pattern is favorably suppressed.

The material of the polyester base is not particularly limited as long as it satisfies the above retardation. Examples thereof include linear saturated polyesters synthesized from an aromatic dibasic acid or ester-forming derivative thereof and a diol or ester-forming derivative thereof. Specific examples of the polyesters include polyethylene terephthalate, polyethylene isophthalate, polybutylene terephthalate, poly(1,4-cyclohexylene dimethylene terephthalate), and polyethylene-2,6-naphthalate.

The polyester used for the polyester base may be a copolymer of the above polyesters, or a blend mainly (e.g. 80 mol % or more) containing the polyester and a small amount (e.g. 20 mol % or less) of other resins. Particularly preferable polyesters include polyethylene terephthalate and polyethylene-2,6-naphthalate because their mechanical properties and optical properties are well balanced. Especially, the polyester base is preferably formed of polyethylene terephthalate (PET) because polyethylene terephthalate is highly versatile and easily available. In the present invention, even a highly-versatile film such as a PET film can provide an optical layered body with which a liquid crystal display device with excellent display quality can be produced. In addition, PET is excellent in transparency, thermal characteristics, and mechanical properties. The retardation thereof can be controlled by stretching treatment. The intrinsic birefringence thereof is large. Accordingly, a comparatively large retardation is obtained even if the film is thin.

The polyester base may be produced by any method, provided that the method satisfies the above retardation. For example, polyesters such as PET as materials are molten and extruded into sheet-shaped unstretched polyester. The polyester is subjected to transverse stretching with a tenter at a temperature not lower than the glass transition temperature, followed by a heat treatment.

The transverse stretching temperature is preferably 80° C. to 130° C., and more preferably 90° C. to 120° C. The transverse stretching ratio is preferably 2.5 to 6.0 times, and more preferably 3.0 to 5.5 times. The transverse stretching ratio of more than 6.0 times tends to lower the transparency of the resulting polyester base. The transverse stretching ratio of less than 2.5 times leads to a smaller orientation tension, so that the resulting polyester base has a smaller birefringence. As a result, the retardation may fail to be 8000 nm or more.

In the present invention, after the transverse stretching of the unstretched polyester under the above conditions with use of a biaxial stretching tester, the polyester may be subjected to stretching in a machine direction relative to the transverse direction (hereinafter, also referred to as longitudinal stretching). In such a case, the stretching ratio in the longitudinal stretching is preferably not more than 2 times. The stretching ratio of more than 2 times in the longitudinal stretching may fail to set the value of Δn within a preferable range.

The treatment temperature in the heat treatment is preferably 100° C. to 250° C., and more preferably 180° C. to 245° C.

An exemplary method for controlling the retardation of the polyester base produced by the above method to 8000 nm or more is appropriate setting of the stretching ratio, the stretching temperature, and the film thickness of the polyester base to be produced. Specifically, the retardation is likely to be higher as the stretching ratio is higher, the stretching temperature is lower, and the film thickness is larger. The retardation is likely to be lower as the stretching ratio is lower, the stretching temperature is higher, and the film thickness is smaller.

The thickness of the polyester base is preferably in a range of 40 to 500 μm. The thickness of less than 40 μm fails to set the retardation of the polyester base to 8000 nm or more. In addition, the anisotropy of mechanical properties becomes evident so that the base is easily cracked or broken to lower the practical utility of the base as an industrial material. The thickness of more than 500 µm makes the polyester base very rigid to lower the flexibility peculiar to polymer films. The practical utility of such a base as an industrial material is unfavorably lowered. The lower limit of the thickness of the polyester base is more preferably 50 µm. The upper limit thereof is more preferably 400 µm and still more preferably 300 µm.

The polyester base preferably has a transparency of 80% or more and more preferably 84% or more in a visible light range. The transparency can be determined in accordance with JIS K7361-1 (Plastics—Determination of the total luminous transmittance of transparent materials).

In the present invention, surface treatments such as saponification, glow discharge, corona discharge, ultraviolet (UV) treatment, and flame treatment may be performed without departing from the spirit of the present invention.

The optical layered body of the present invention has a primer layer on a polyester base.

The primer layer is a layer provided for the primary purpose of improving adhesion between the polyester base and the hard coat layer.

In the optical layered body of the first aspect of the present invention, the refractive index (np) of the primer layer, the refractive index (nx) in the slow axis direction of the polyester base, and the refractive index (ny) in the fast axis direction of the polyester base satisfy a relation of ny<np<nx. Such a relation of the refractive indexes reduces the difference in the refractive index between the primer layer and the polyester base. As a result, occurrence of interference fringes is suppressed in the optical layered body of the first aspect of the present invention.

The refractive index (np) of the primer layer is between the minimum refractive index (ny) (1.55) in the fast axis direction of the polyester base and the maximum refractive index (nx) (1.78) in the slow axis direction of the polyester base. The preferable range of the refractive index is 1.57 to 1.65 from the standpoint of prevention of occurrence of interference fringes.

Additionally, in the optical layered body of the first aspect of the present invention, the refractive index (nh) of the hard coat layer satisfying a specific relation with the refractive index (nx) in the slow axis direction of the polyester base and the refractive index (ny) in the fast axis direction of the polyester base, as mentioned below, further reduces a negative influence of the refractive index of the primer layer on the interference fringes prevention performance.

Specifically, the refractive index (nh) of the hard coat layer is between the minimum refractive index (ny) (1.55) in the fast axis direction of the polyester base and the maximum refractive index (nx) (1.78) in the slow axis direction of the polyester base. The preferable range of the refractive index is 1.57 to 1.65 from the standpoint of prevention of occurrence of interference fringes. The lower limit is more preferably 1.62.

In the optical layered body of the first aspect of the present invention, the material of the primer layer is not particularly limited, provided that the above conditions of the refractive index are satisfied. For example, materials appropriately selected from conventionally known materials may be used. Examples thereof include thermosetting or thermoplastic polyester, urethane, and acrylic resins and variants of these.

For adjustment of the refractive index of the primer layer, high refractive particles, chelate compounds, and the like may be added.

Examples of the polyester resins include polyesters obtained from below-mentioned polybasic acid compounds and diol compounds.

Examples of the polybasic acid compounds include terephthalic acid, isophthalic acid, phthalic acid, acid phthalic anhydride, 2,6-naphthalene dicarboxylic acid, 1,4-cyclohexane dicarboxylic acid, adipic acid, sebacic acid, trimellitic acid, pyromellitic acid, dimer acid, and 5-sodium sulfoisophthalic acid.

Examples of the diol compounds include ethylene glycol, 1,4-butandiol, diethylene glycol, dipropylene glycol, 1,6-hexanediol, 1,4-cyclohexandimethanol, xylene glycol, dimethylolpropane, polyethylene oxide) glycol, poly(tetramethylene oxide) glycol, and the like.

The acrylic resins may be obtained, for example, by copolymerization of the below-mentioned monomers.

Examples of the monomers include: alkyl acrylate and alkyl methacrylate (alkyl group: methyl, ethyl, n-propyl, isopropyl, n-butyl, isobutyl, t-butyl, 2-ethylhexyl, cyclohexyl groups and the like); hydroxy containing monomers such as 2-hydroxyethyl acrylate, 2-hydroxyethyl methacrylate, 2-hydroxypropyl acrylate, and 2-hydroxypropyl methacrylate; epoxy containing monomers such as glycidyl acrylate, glycidyl methacrylate, and allyl glycidyl ether; monomers containing a carboxy group or a salt thereof such as acrylic acid, methacrylic acid, itaconic acid, maleic acid, fumaric acid, crotonic acid, styrenesulfonic acid and their salts (e.g. sodium salt, potassium salt, ammonium salt, tertiary amine salt); monomers containing an amide group such as acrylamide, methacrylamide, N-alkyl acrylamide, N-alkyl methacrylamide, N,N-dialkyl acrylamide, N,N-dialkyl methacrylate (alkyl group: methyl, ethyl, n-propyl, isopropyl, n-butyl, isobutyl, t-butyl, 2-ethylhexyl, cyclohexyl groups and the like), N-alkoxy acrylamide, N-alkoxy methacrylamide, N,N-dialkoxy acrylamide, N,N-dialkoxy methacrylamide (alkoxy group: methoxy, ethoxy, butoxy, isobutoxy groups and the like), acryloyl morpholine, N-methylolacrylamide, N-methylolmethacrylamide, N-phenyl acrylamide, and N-phenyl methacrylamide; monomers of acid anhydrides such as maleic acid anhydride and itaconic acid anhydride; oxazoline group-containing monomers such as 2-vinyl-2-oxazolline, 2-vinyl-4-methyl-2-oxazolline, 2-vinyl-5-methyl-2-oxazolline, 2-isopropenyl-2-oxazolline, 2-isopropenyl-4-methyl-2-oxazolline, and 2-isopropenyl-5-methyl-2-oxazolline; methoxy diethylene glycol methacrylate, methoxy polyethylene glycol methacrylate, vinyl isocyanate, allyl isocyanate, styrene, α-methylstyrene, vinyl methyl ether, vinyl ethyl ether, vinyltrialkoxysilane, alkyl maleic acid monoester, alkyl fumaric acid monoester, alkyl itaconic acid monoester, acrylonitrile, methacrylonitrile, vinylidene chloride, ethylene, propylene, vinyl chloride, vinyl acetate, and butadiene.

The urethane resin may contain, for example, polyol, polyisocyanate, chain extenders, crosslinking agents, and the like.

Examples of the polyol include: polyethers such as polyoxyethylene glycol, polyoxypropylene glycol, and polyoxytetramethylene glycol; polyesters produced by a dehydration reaction between glycol and a dicarboxylic acid, such as polyethylene adipate, polyethylene-butyrene adipate, polycaprolactone and the like; polycarbonates having a carbonate bond, acrylic polyols, and castor oil.

Examples of the polyisocyanates include tolylene diisocyanate, phenylene diisocyanate, 4,4'-diphenylmethane diisocyanate, hexamethylene diisocyanate, xylylene diisocyanate, 4,4'-dicyclohexylmethane diisocyanate, and isophorone diisocyanate.

Examples of the chain extenders and crosslinking agents include ethylene glycol, propylene glycol, diethylene glycol, trimethylolpropane, hydrazine, ethylene diamine, diethylenetriamine, triethylenetetramine, 4,4-diamino diphenylmethane, 4,4'-diamino dicyclohexylmethane, and water.

Favorable examples of the high refractive particles include metal oxide particles having a refractive index of 1.60 to 2.80.

Specific examples of the metal oxide particles include titanium oxide ($TiO_2$, refractive index of 2.71), zirconium oxide ($ZrO_2$, refractive index of 2.10), cerium oxide ($CeO_2$, refractive index of 2.20), tin oxide ($SnO_2$, refractive index of 2.00), antimony-tin oxide (ATO, refractive index of 1.75 to 1.95), indium tin oxide (ITO, refractive index of 1.95 to 2.00), phosphorus tin compounds (PTO, refractive index of 1.75 to 1.85), antimony oxide ($Sb_2O_5$, refractive index of 2.04), aluminum zinc oxide (AZO, refractive index of 1.90 to 2.00), gallium zinc oxide (GZO, refractive index of 1.90 to 2.00), niobium pentoxide ($Nb_2O_5$, refractive index of 2.33), tantalum oxide ($Ta_2O_5$, refractive index of 2.16), and zinc antimonite ($ZnSb_2O_6$, refractive index of 1.90 to 2.00).

The high refractive particles preferably have an average primary particle size of 5 to 100 nm. The average primary particle size of more than 100 nm may cause optical scattering in the primer layer to lower the transparency. The average primary particle size of less than 5 nm may increase aggregation of the particles to increase the secondary particle size. In such a case, optical scattering may be caused to lower the transparency of the primer layer.

The refractive index of the high refractive particles can be obtained as follows, for example. A thermoplastic resin with a known refractive index is mixed with a metal oxide that is preliminary subjected to mass determination. The mixture is molded into a transparent pellet having an appropriate thickness. The refractive index of the pellet is measured. Based on the blending ratio of the metal oxide and the resin with a known refractive index, the refractive index of the high refractive particles can be calculated. The refractive index can be determined by the Becke method in accordance with A method of JIS K 7142 (2008) using an Abbe refractometer. For example, a DR-M4 produced by ATAGO CO., LTD. may be used. Here, the wavelength for measuring the refractive index is set to 589 nm.

The average primary particle size can be determined as an average value of the particle sizes of 20 particles observed in the image analysis with a transmission electron microscope such as TEM and STEM.

The amount of the high refractive particles is not particularly limited, and may be appropriately adjusted in the relations with other components so that the refractive index of a hard coat layer to be formed satisfies the above relation in the weighted average with a value of a preliminary-determined refractive index of a cured product of a resin component to be added to the primer layer.

Examples of the chelate compounds include water-soluble titanium chelate compounds, water-soluble titanium acylate compounds, and water-soluble zirconium compounds.

Examples of the water-soluble titanium chelate compounds include diisopropoxy bis(acetylacetonato) titanium, isopropoxy(2-ethyl-1,3-hexanediolate) titanium, diisopropoxy bis(triethanolaminato) titanium, di-n-butoxy bis(triethanolaminato) titanium, hydroxy bis(lactato) titanium, ammonium salt of hydroxy bis(lactato) titanium, and titanium peroxocitric acid ammonium salt.

Examples of the water-soluble titanium acylate compounds include oxotitanium bis(monoammonium oxalate).

Examples of the water-soluble zirconium compounds include zirconium tetraacetylacetonate and zirconium acetate.

In the optical layered body of the first aspect of the present invention, the thickness of the primer layer is not particularly limited, and may be appropriately adjusted in accordance with the required properties. The thickness may be set to, for example, 10 to 1000 nm. The maximum thickness of the primer layer is preferably 500 nm or less because the pencil hardness (in accordance with JIS K5600-5-4) of the optical layered body of the first aspect of the present invention is improved. Particularly, the maximum thickness of 300 nm or less is more preferable because the pencil hardness is clearly improved (e.g. the pencil hardness is improved from H at the thickness of 800 nm to 2H).

In the optical layered body of the first aspect of the present invention, as mentioned above, the refractive index (np) of the primer layer has a specific relation with the refractive index (nx) in the slow axis direction of the polyester base and the refractive index (ny) in the fast axis direction of the polyester base. Accordingly, the thickness of the primer layer is set within a comparatively wide range. The reason for this is that, in the optical layered body of the first aspect of the present invention, the refractive index (np) of the primer layer satisfying the specific relation with the refractive index (nx) in the slow axis direction of the polyester base and the refractive index (ny) in the fast axis direction of the polyester base reduces negative influence of the thickness of the primer layer on the interference fringes prevention performance. Accordingly, even in the case where the primer layer in the optical layered body of the first aspect of the present invention is thicker than the primer layer in the optical layered body of the second aspect of the present invention described later, the interference fringes prevention performance is excellent.

The thickness of the primer layer is the average (nm) of the thicknesses at any 10 points in the cross section of the primer layer observed with an electron microscope (SEM, TEM, STEM). When the thickness is so small, a micrograph at high magnification is taken and is further enlarged for measurement of the thickness. In the enlarged view, the interface line is thick, which has been so fine to be barely recognizable as a boundary in the original micrograph. In such a case, the bisector of the thick line width is used as a boundary in the measurement.

In the optical layered body of the second aspect of the present invention, the thickness of the primer layer is 3 to 30 nm. The thickness of less than 3 nm leads to insufficient adhesion between the polyester base and the hard coat layer. The thickness of more than 30 nm results in insufficient interference prevention performance of the optical layered body of the second aspect of the present invention. In the optical layered body of the second aspect of the present invention, the lower limit of the thickness of the primer layer is preferably 10 nm and the upper limit thereof is preferably 20 nm.

The thickness of the primer layer in the optical layered body of the second aspect of the present invention is obtained in the same manner as that of the primer layer in the optical layered body of the first aspect of the present invention.

In the optical layered body of the second aspect of the present invention, the refractive index of the primer layer is not particularly limited. In the optical layered body of the second aspect of the present invention, the primer layer is significantly thin. The refractive index (nh) of the hard coat layer has a specific relation with the refractive index (nx) in the slow axis direction of the polyester base and the refractive index (ny) in the fast axis direction of the polyester base as described later. In such a case, a negative influence of the refractive index of the primer layer on the interference fringes prevention performance is smaller.

The material of the primer layer in the optical layered body of the second aspect of the present invention is not particularly limited, and may be a material conventionally used for primer layers of optical layered bodies.

In consideration of the material conventionally used for primer layers of optical layered bodies, if the material satisfying the adhesion and hardness is selected, the refractive index of the primer layer is set within a range of 1.47 to 1.80. In comparison with the case where the thickness of the primer layer is not controlled, the choice of the material for the primer layer is favorably very large in the optical layered body of the second aspect of the present invention.

The refractive index (nh) of the hard coat layer is between the minimum refractive index (ny) (1.55) in the fast axis direction of the polyester base and the maximum refractive index (nx) (1.78) in the slow axis direction of the polyester base, as described later. The range of the refractive index especially preferable for prevention of interference fringes is 1.57 to 1.65. The lower limit thereof is more preferably 1.62.

In the case where the material conventionally used for primer layers of optical layered bodies does not include the high refractive particles mentioned above, the refractive index (np) of the primer layer is commonly lower than the refractive index (ny) in the fast axis direction of the polyester base. The primer layer containing the high refractive particles is disadvantageous in terms of the production cost. Additionally, as the combination of the high refractive particles and other resin materials needs to be considered, selection of the materials is limited.

Accordingly, in the optical layered body of the second aspect of the present invention, the refractive index (np) of the primer layer preferably has a smaller value. Specifically, the refractive index (ny) in the fast axis direction of the polyester base and the refractive index (np) of the primer layer preferably satisfy ny>np. Such a relation in the refractive index has problematically caused occurrence of interference fringes in the primer layer of a conventional optical layered body because the primer layer was thick as more than 30 nm. In the optical layered body of the second aspect of the present invention, however, since the primer layer is extremely thin as 3 to 30 nm, the relation of ny>np does not cause occurrence of interference fringes.

In the optical layered body of the second aspect of the present invention, the refractive index (np) of the primer layer preferably has a value as close as possible to the value of the refractive index (ny) in the fast axis direction of the polyester base in the relation of ny>np. Specifically, the difference (ny−np) between the refractive index (ny) in the fast axis direction of the polyester base and the refractive index (np) of the primer layer is preferably not more than 0.05. The difference exceeding 0.05 may only exert lowered effect of preventing interference fringes.

For further excellent interference fringes prevention performance of the optical layered body of the second aspect of the present invention, the difference (nx−nh) between the refractive index (nx) in the slow axis direction of the polyester base and the refractive index (nh) of the hard coat layer, and the difference (nh−ny) between the refractive index (nh) of the hard coat layer and the refractive index (ny) in the fast axis direction of the polyester base are both preferably not less than 0.025.

In the optical layered body of the present invention, the primer layer can be formed using a composition for a primer layer prepared by mixing and dispersing the above materials and optionally a photopolymerization initiator and other components in a solvent.

The mixing and dispersing treatment may be performed using a known device such as a paint shaker, a bead mill, and a kneader.

Water is preferably used as the solvent and it is preferably in the form of an aqueous coating liquid such as an aqueous solution, an aqueous dispersion, and an emulsion. A small amount of an organic solvent may be contained.

Examples of the organic solvent include alcohols (e.g. methanol, ethanol, propanol, isopropanol, n-butanol, s-butanol, t-butanol, benzyl alcohol, PGME, ethylene glycol), ketones (e.g. acetone, methyl ethyl ketone, methyl isobutyl ketone, cyclopentanone, cyclohexanone, heptanone, diisobutyl ketone, diethyl ketone), aliphatic hydrocarbons (e.g. hexane, cyclohexane), halogenated hydrocarbons (e.g. methylene chloride, chloroform, carbon tetrachloride), aromatic hydrocarbons (e.g. benzene, toluene, xylene), amides (e.g. dimethylformamide, dimethyl acetoamide, n-methylpyrrolidone), ethers (e.g. diethyl ether, dioxane, tetrahydrofuran), ether alcohols (e.g. 1-methoxy-2-propanol), and esters (e.g. methyl acetate, ethyl acetate, butyl acetate, isopropyl acetate).

The other components are not particularly limited, and examples thereof include leveling agents, organic or inorganic particles, photopolymerization initiators, thermal polymerization initiators, crosslinking agents, curing agents, polymerization accelerators, viscosity modifiers, antistatic agents, antioxidants, stain-proofing agents, slip agents, refractive index modifiers, and dispersants.

The composition for a primer layer preferably has a total solids content of 3% to 20%. The total solids content of less than 3% may cause a residual solvent and whitening. The total solids content of more than 20% may increase the viscosity of the composition for a primer layer to lower the coating properties of the composition. In such a case, unevenness or stripes may appear on the coating surface, so that the film may fail to have a desired thickness. The total solids content is more preferably 4% to 10%.

The composition for a primer layer may be applied to the polyester base at any steps. The composition is preferably applied in the production of the polyester base. The composition is more preferably applied to the polyester base prior to completion of oriented crystallization.

The polyester base prior to the completion of the oriented crystallization includes an unstretched film, a uniaxially oriented film in which an unstretched film is oriented in one of the lengthwise direction and the transverse direction, and a film stretched at a small magnification and oriented in two directions of the lengthwise direction and the transverse direction (a biaxially stretched film prior to the completion of oriented crystallization by re-stretching in the lengthwise direction and the transverse direction). In particular, the unstretched film or the uniaxially oriented film oriented in one direction is preferably subjected to application of an aqueous coating liquid of the composition for a primer layer, directly followed by lengthwise stretching and/or transverse stretching, and thermal setting.

In application of the composition for a primer layer to the polyester base, the surface of the polyester base is preferably subjected to a physical treatment such as a corona surface treatment, a flame treatment and a plasma treatment, as a pretreatment for improving the coating property. Alternatively, the composition for a primer layer is preferably used in combination with a surfactant chemically inactive with the composition.

The composition for a primer layer may be applied by any of known methods. Examples of the methods include roll coating, gravure coating, roll brushing, spray coating, air knife coating, impregnation, and curtain coating. Each of these methods may be used alone, or two or more of these may be used in combination. A coating film may be optionally formed only on one face of the polyester base or on both faces thereof. Namely, as illustrated in FIG. 2, in the case where a primer layer 22 is formed on each face of a polyester base 21 in an optical layered body 20 of the present invention, and a hard coat layer 23 may be formed on each of the primer layers 22 on the side opposite the polyester base 21 side. FIG. 2 is a schematic cross-sectional view of another example of the optical layered body of the present invention.

In the optical layered body of the present invention, a primer layer in the optical layered body of the first aspect may be formed on one face of the polyester base, and a primer layer in the optical layered body of the second aspect may be formed on the other face of the polyester base. In such a case, a hard coat layer in the optical layered body of the first aspect is formed on the primer layer on the side opposite the polyester base side in the optical layered body of the first aspect, and a hard coat layer in the optical layered body of the second aspect is formed on the primer layer on the side opposite the polyester base side in the optical layered body of the second aspect.

In the optical layered body of the present invention, a hard coat layer is formed on the primer layer.

The hard coat layer secures the hard coating characteristic of the surface of the optical layered body of the present invention, and is preferably formed of, for example, a composition for a hard coat layer containing an ionizing radiation-curable resin that is cured by UV rays and a photopolymerization initiator.

In the optical layered body of the present invention, examples of the ionizing radiation-curable resin include compounds having one or two or more unsaturated bonds of a compound having an acrylate functional group and the like. Examples of the compound having one unsaturated bond include ethyl (meth)acrylate, ethyl hexyl(meth)acrylate, styrene, methylstyrene, and N-vinyl pyrrolidone. Examples of the compound having two or more unsaturated bonds include polymethylolpropane tri(meth)acrylate, tripropylene glycol di(meth)acrylate, diethyleneglycol di(meth)acrylate, pentaerythritol tri(meth)acrylate, pentaerythritol tetra(meth)acrylate, dipendaerythritol hexa(meth)acrylate, dipendaerythritol penta(meth)acrylate, 1,6-hexanediol di(meth)acrylate, neopentylglycol di(meth)acrylate, polyfunctional compounds prepared by modifying any of above compounds with ethylene oxide (EO) or the like, and reaction products of any of the polyfunctional compounds and (meth)acrylate (e.g. poly(meth)acrylate esters of polyvalent alcohols). The term "(meth)acrylate" herein refers to methacrylate and acrylate.

In addition to the above compounds, also usable as the ionizing radiation-curable resin are polyester, polyether, acryl, epoxy, urethane, alkyd, spiroacetal, polybutadiene, polythiol polyene resins having comparatively low molecular weights (number average molecular weight 300 to 80000, preferably 400 to 5000). The resin herein includes all of dimers, oligomers, and polymers, but monomers.

A preferable compound in the present invention includes a compound having three or more unsaturated bonds. Such a compound increases the crosslinking density of the hard coat layer to be formed to enhance the coating hardness.

Specifically, in the present invention, use of pentaerythritol triacrylate, pentaerythritol tetraacrylate, polyester polyfunctional acrylate oligomers (3 to 15 functions), and urethane polyfunctional acrylate oligomers (3 to 15 functions) in an appropriate combination is preferable.

The ionizing radiation-curable resin may be used in combination with a solvent-drying resin (resin formed into a coating film only by drying the solvent added for adjusting the solids content in application, e.g. thermoplastic resins). Combination use of a solvent-drying resin effectively prevents defective coating on the application surface. The solvent-drying resin usable with the ionizing radiation-curable resin is not particularly limited, and may be a thermoplastic resin.

The thermoplastic resin is not particularly limited, and examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber/elastomers. The thermoplastic resin is preferably amorphous and soluble in an organic solvent (especially a common solvent dissolving a plurality of polymers and curable compounds). From the standpoint of film-forming properties, transparency, and weather resistance, preferable resins are styrene resins, (meth)acrylic resins, alicyclic olefin resins, polyester resins, and cellulose derivatives (cellulose esters).

The composition for a hard coat layer may contain a thermosetting resin.

The thermosetting resin is not particularly limited, and examples thereof include phenol, urea, diallyl phthalate, melamine, guanamine, unsaturated polyester, polyurethane, epoxy, aminoalkyd, melamine-urea cocondensated, silicone, and polysiloxane resins.

The photopolymerization initiator is not particularly limited, and a known photopolymerization initiator may be used. Specific examples thereof include acetophonones, benzophenones, Michler's benzoylbenzoates, α-amyloxime esters, thioxanthones, propiophenones, benzyls, benzoins, and acylphosphine oxides. Combination use with a photosensitizer is preferable. Specific examples of the photosensitizer include n-butylamine, triethylamine, and poly-n-butylphosphine.

In the case where the ionizing radiation-curable resin is a resin having a radical polymerizable unsaturated group, the photopolymerization initiator is preferably acetophenones, benzophenones, thioxanthones, benzoin, benzoin methylether, or the like. Each of these may be used alone, or two or more of these may be used in combination. In the case where the ionizing radiation-curable resin is a resin having a cationic polymerizable functional group, the photopolymerization initiator is preferably aromatic diazonium salt, aromatic sulfonium salt, aromatic iodonium salt, a metallocene compound, benzoin sulfonate ester, or the like. Each of these may be used alone, or two or more of these may be used in combination.

In the case of the ionizing radiation-curable resin having a radical polymerizable unsaturated group, the initiator used in the present invention is preferably 1-hydroxy-cyclohexyl-phenyl-ketone because it has a compatibility with the ionizing radiation-curable resin and is less likely to cause yellowing.

The amount of the photopolymerization initiator in the composition for a hard coat layer is preferably 1 to 10 parts by weight for 100 parts by weight of the ionizing radiation-curable resin. An amount of less than 1 part by weight of the photopolymerization initiator may fail to set the hardness of the hard coat layer in the optical layered body of the first aspect of the present invention within the above-mentioned range. An amount of more than 10 parts by weight may fail to achieve the aimed pencil hardness of not lower than 3H on the surface of the hard coat layer because the ionizing radiation-curable resin cannot reach the deep part of the film.

The lower limit of the amount of the photopolymerization initiator is more preferably 2 parts by weight, and the upper limit thereof is more preferably 8 parts by weight. The amount of the photopolymerization initiator within that range prevents hardness distribution in the thickness direction of the film, easily resulting in the uniform hardness.

The composition for a hard coat layer may contain a solvent.

The solvent may be selected in accordance with the kind and solubility of the resin component to be used. Examples thereof include ketones (e.g. acetone, methyl ethyl ketone, methyl isobutyl ketone, cyclohexanone, diacetone alcohol), ethers (dioxane, tetrahydrofuran, propylene glycol monomethyl ether, propylene glycol monomethyl ether acetate), aliphatic hydrocarbons (e.g. hexane), alicyclic hydrocarbons (e.g. cyclohexane), aromatic hydrocarbons (e.g. toluene, xylene), halogenated carbons (e.g. dichloromethane, dichloroethane), esters (e.g. methyl acetate, ethyl acetate, butyl acetate), water, alcohols (e.g. ethanol, isopropanol, butanol, cyclohexanol), cellosolves (e.g. methyl cellosolve, ethyl cellosolve), cellosolve acetates, sulfoxides (e.g. dimethyl sulfoxide), and amides (e.g. dimethyl formamide, dimethyl acetoamides). Each of these may be used in a mixture with other components.

In the present invention, especially, the solvent is preferably a ketone solvent containing at least one of methyl ethyl ketone, methyl isobutyl ketone, cyclohexanone, and a mixture of these, from the standpoint of compatibility with a resin and fine coating properties.

The proportion (solids content) of the materials in the composition for a hard coat layer is not particularly limited, and is commonly 5% to 70% by mass, and preferably 25% to 60% by mass.

The composition for a hard coat layer may contain conventionally known additives such as organic/inorganic particles, dispersants, surfactants, antistatic agents, silane coupling agents, viscosifiers, coloring inhibitors, colorants (pigment, dye), antifoam agents, leveling agents, flame retardants, UV absorbers, tackifiers, polymerization inhibitors, antioxidants, and surface modifiers, in accordance with the purposes such as increasing the hardness of the hard coat layer, suppressing shrinkage on curing, preventing blocking, controlling the refractive index, providing an antiglare property, and modifying particles and the surface of the hard coat layer.

The composition for a hard coat layer may be used in the form of a mixture with a photosensitizer. Specific examples of the photosensitizer include n-butylamine, triethylamine, and poly-n-butylphosphine.

A method for preparing the composition for a hard coat layer is not particularly limited, provided that the components can be uniformly mixed. A known device may be used such as a paint shaker, a bead mill, a kneader, and a mixer.

A method for applying the composition for a hard coat layer to the primer layer is not particularly limited, and a known method may be used such as spin coating, dipping, spraying, die coating, bar coating, roll coating, meniscus coating, flexo printing, screen printing, and bead coating.

In the optical layered body of the present invention, the refractive index (nh) of the hard coat layer, the refractive index (nx) in the slow axis direction of the polyester base, and the refractive index (ny) in the fast axis direction of the polyester base have a relation of ny<nh<nx. In the optical layered body of the present invention, the hard coat layer has the above relation in the refractive index with the polyester base. In addition, in the optical layered body of the first aspect of the present invention, the primer layer has the specific refractive index (np) as mentioned above, and the primer layer in the optical layered body of the second aspect of the present invention is extremely thin as mentioned above. Accordingly, any of these contributes to favorable prevention of occurrence of interference fringes.

In the optical layered body of the first aspect of the present invention in which both the refractive index (nh) of the hard coat layer and the refractive index (np) of the primer layer are between the refractive index (nx) in the slow axis direction of the polyester base and the refractive index (ny) in the fast axis direction of the polyester base, the difference between the refractive index (nh) of the hard coat layer and the refractive index (np) of the primer layer is small. This means the difference in the refractive index is virtually eliminated between these layers. Virtual elimination of the difference between the refractive index (nh) of the hard coat layer and the refractive index (np) of the primer layer suppresses reflection on the interface between the hard coat layer and the primer layer. As a result, occurrence of interference fringes is favorably prevented. The virtual elimination of the difference between the refractive index (nh) of the hard coat layer and the refractive index (np) of the primer layer refers to a case where the absolute value (|nh−np|) of the difference between the refractive index (nh) of the hard coat layer and the refractive index (np) of the primer layer is not more than 0.05.

In the optical layered body of the second aspect of the present invention, the refractive index (nh) of the hard coat layer satisfies the above relation with the refractive index (nx) in the slow axis direction of the polyester base and the refractive index (ny) in the fast axis direction of the polyester base. In the case where the refractive index (nh) is closer to the refractive index (nx) in the slow axis direction of the polyester base, the hard coat layer has a higher refractive index. Accordingly, in the case where the optical layered body of the second aspect of the present invention is used in a touch panel, the refractive index is close to the refractive index of an electrode (e.g. ITO) formed on the topmost surface, which is advantageous in making the pattern of the electrode invisible.

Alternatively, in the case where the refractive index (nh) of the hard coat layer has an intermediate value between the refractive index (nx) in the slow axis direction of the polyester base and the refractive index (ny) in the fast axis direction of the polyester base, or where the refractive index (nh) is closer to the refractive index (ny) in the fast axis direction of the polyester base, the optical layered body of the second aspect of the present invention is significantly excellent in interference fringes prevention performance.

Such a hard coat layer in the optical layered body of the present invention is preferably formed using a composition for a high refractive hard coat layer which is prepared by adding high refractive particles to the above composition for a hard coat layer. The high refractive particles can make the refractive index of the hard coat layer satisfy the above-mentioned relation with the refractive indexes of the polyester base.

Preferably used as the high refractive particles are metal oxide particles having a refractive index of 1.50 to 2.80. Specific examples of the metal oxide particles include titanium oxide ($TiO_2$, refractive index of 2.71), zirconium oxide ($ZrO_2$, refractive index of 2.10), cerium oxide ($CeO_2$, refractive index of 2.20), tin oxide ($SnO_2$, refractive index of 2.00), antimony-tin oxide (ATO, refractive index of 1.75 to 1.95), indium tin oxide (ITO, refractive index of 1.95 to 2.00), phosphorus tin compounds (PTO, refractive index of 1.75 to 1.85), antimony oxide ($Sb_2O_5$, refractive index of 2.04), aluminum zinc oxide (AZO, refractive index of 1.90 to 2.00), gallium zinc oxide (GZO, refractive index of 1.90 to 2.00), and zinc antimonite ($ZnSb_2O_6$, refractive index of 1.90 to 2.00). In particular, tin oxide ($SnO_2$), antimony-tin oxides (ATO), indium tin oxide (ITO), phosphorus tin compounds (PTO), antimony oxide ($Sb_2O_5$), aluminum zinc oxide (AZO), gallium zinc oxide (GZO), and zinc antimonite ($ZnSb_2O_6$) are advantageous in their capability of providing antistatic properties, because they are conductive metal oxides, controls dispersion of particles, and forms a conductive path.

The amount of the high refractive particles is not particularly limited, and may be appropriately adjusted in the relations with other components so that the refractive index of the hard coat layer to be formed satisfies the above relation in the weighted average with the value of the preliminary-determined refractive index of a cured product of a resin component to be added to the primer layer.

A method for applying the composition for a hard coat layer to the primer layer is not particularly limited, and a known method may be used such as spin coating, gravure coating, dipping, spraying, die coating, bar coating, roll coating, meniscus coating, flexo printing, screen printing, and bead coating.

Preferably, the film formed by applying the composition for a hard coat layer to the primer layer is optionally heated and/or dried, followed by active energy ray irradiation or the like for curing.

Examples of the active energy ray irradiation include UV irradiation and electron beam irradiation. Specific examples of UV sources include light sources such as ultra-high pressure mercury lamps, high pressure mercury lamps, low-pressure mercury lamps, carbon-arc lamps, black-light fluorescent lamps, and metal halide lamps. The wavelength of the UV rays may be 190 to 380 nm. Specific examples of electron beam sources include various electron beam accelerators such as Cockcroft-Walton type, Bandegraft type, resonance transformer type, insulated core transformer type, linear type, Dynamitron type, and high frequency type.

The hard coat layer (cured) has a thickness of preferably 0.5 to 100 μm, more preferably 0.8 to 20 μm, and still more preferably 2 to 10 μm because anticurl properties and anticracking properties are especially excellent. The thickness of the hard coat layer is the average (μm) of the thicknesses at any 10 points in the cross section of the primer layer observed with an electron microscope (SEM, TEM, STEM). The thickness of the hard coat layer may also be an average value of the thicknesses at any 10 points in the cross section of the hard coat layer observed with a Digimatic indicator IDF-130 produced by Mitsutoyo Corporation.

Addition of an antistatic agent to the composition for a hard coat layer provides the hard coat layer with antistatic properties.

Conventionally known antistatic agents may be used, and examples thereof include cationic antistatic agents such as quaeternary ammonium salt, fine particles such as tin doped indium oxide (ITO), and conductive polymers.

In the case of using the antistatic agent, the amount thereof is preferably 1% to 30% by mass.

The optical layered body of the present invention preferably further has a low refractive layer on the hard coat layer.

The low refractive layer is preferably formed any of 1) a resin containing silica or magnesium fluoride, 2) a fluororesin that is a low refractive resin, 3) a fluororesin containing silica or magnesium fluoride, and 4) a thin film of silica or magnesium fluoride. For the resin other than the fluororesin, the same resins as those used for binder resins may be used.

The silica is preferably hollow silica particles, and such hollow silica particles can be obtained by the method disclosed in Examples in JP-A 2005-099778.

The low refractive layer preferably has a refractive index of not more than 1.47 and particularly preferably not more than 1.42.

The thickness of the low refractive layer is not particularly limited, and may be appropriately set commonly within a range of 10 nm to 1 μm.

The fluororesin may be a polymerizable compound containing at least fluorine atoms in a molecule, or a polymer thereof. The polymerizable compound is not particularly limited, and preferably contains a curable group such as a functional group to be cured by ionizing radiations and a thermosetting polar group. Alternatively, a compound having both these reactive groups at the same time may be used. In contrast to the polymerizable compound, a polymer does not have any reactive group mentioned above.

Examples of the polymerizable compound having a functional group to be cured by ionizing radiations include fluorine-containing monomers having ethylene unsaturated bonds. Specific examples thereof include fluoroolefins (e.g. fluoroethylene, vinylidene fluoride, tetrafluoroethylene, hexafluoropropylene, perfluorobutadiene, perfluoro-2,2-dimethyl-1,3-dioxol). Examples of the polymerizable compound having a (meth)acryloyloxy group include: (meth)acrylate compounds having a fluorine atom in a molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perflulorodecyl)ethyl (meth)acrylate, α-trifluoro methyl (meth)acrylate, and α-trifluoro ethyl (meth)acrylate; and fluorine-containing polyfunctional (meth)acrylate ester compounds containing a C1 to C14 fluoroalkyl, fluorocycloalkyl, or fluoroalkylene group having at least three fluorine atoms, and at least two (meth)acryloyloxy groups.

Preferable examples of the thermosetting polar group include hydrogen bond forming groups such as hydroxyl, carboxyl, amino, and epoxy groups. These groups are excellent in the affinity with inorganic ultrafine particles of silica and the like, in addition to the adhesiveness with the coating film. Examples of the polymerizable compound having a thermosetting polar group include 4-fluoroethylene-perfluoroalkylvinylether copolymers; fluoroethylene-hydrocarbon vinyl ether copolymers; and fluorine-modified products of epoxy, polyurethane, cellulose, phenol, polyimide resins.

Examples of the compound having both the functional group to be cured by ionizing radiations and the thermosetting polar group at the same time include partially or fully fluorinated alkyl, alkenyl, and aryl esters of acrylic or methacrylic acids, fully or partially fluorinated vinyl ethers, fully or partially fluorinated vinyl esters, and fully or partially fluorinated vinyl ketones.

Examples of the fluororesins include: polymers of a monomer or monomer mixture containing at least one fluorine-containing (meth)acrylate compound of a polymerizable compound having the functional group cured by ionizing radiations; copolymers of at least one of the fluorine-containing (meth)acrylate compounds, and a (meth)acrylate compound containing no fluorine atom in a molecule such as methyl (meth)acrylate, ethyl (meth)acrylate, propyl (meth)acrylate, butyl (meth)acrylate, and 2-ethylhexyl (meth)acrylate; and homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene. Also usable are silicone-containing vinylidene fluoride copolymers in which any of the above copolymers further contains a silicone component. Examples of the silicone component include (poly)dimethylsiloxane, (poly) diethylsiloxane, (poly)diphenylsiloxane, (poly) methylphenylsiloxane, alkyl-modified (poly)dimethylsiloxane, azo group-containing (poly)dimethylsiloxane, dimethyl silicone, phenylmethyl silicone, alkyl•aralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone epoxy-modified silicone, mercapto-modified silicone, fluorine-modified silicone, and polyether-modified silicone. In particular, those having a dimethylsiloxane structure are preferable.

In addition, also usable as fluororesins are nonpolymers or polymers formed of compounds mentioned below. Namely, usable compounds are a compound obtainable by a reaction between a fluorine-containing compound having at least one isocyanato group in a molecule and a compound having at least one functional group reactive with an isocyanato group such as amino, hydroxyl, and carboxyl groups in a molecule; and a compound obtainable by a reaction between a compound having an isocyanato group and a fluorine-containing polyol such as fluorine-containing polyether polyol, fluorine-containing alkyl polyol, fluorine-containing polyester polyol, and fluorine-containing ε-caprolactone-modified polyol.

The polymerizable compound and polymers having fluorine atoms may be mixed with various binder resins as mentioned above. Additionally, a curing agent for curing reactive groups and the like, and various additives and solvents for improving the coating property or providing the stain-proofing property may be appropriately used.

In formation of the low refractive layer, a composition for a low refractive layer containing a low refractive agent, a resin, and the like preferably has a viscosity of 0.5 to 5 mPa·s (25° C.) and more preferably 0.7 to 3 mPa·s (25° C.) for a favorable coating property thereof. Such a composition for a low refractive layer realizes an excellent antireflection layer of visible light, forms a uniform thin film without uneven coating, and forms a low refractive layer especially excellent in adhesiveness.

The resin may be cured in the same manner as in curing of a hard coat layer mentioned later. In the case of curing by heat, a fluororesin composition preferably contains a thermal polymerization initiator that generates, for example, a radical by heat to initiate polymerization of a polymerizable compound.

An exemplary method for producing the optical layered body of the present invention includes the steps of: forming a coating film for a hard coat layer on a primer layer formed on a polyester base by a method mentioned above; optionally drying and then curing the coating film to form a hard coat layer; and optionally forming the low refractive layer on the hard coat layer by a known method.

The method for drying the film for a hard coat layer is not particularly limited, and may be dried commonly at 30° C. to 120° C. for 3 to 120 seconds.

The coating film for a hard coat layer may be appropriately cured by a known method depending on the constituents thereof. For example, in the case where the contained binder resin component is curable by UV rays, the coating film may be irradiated with UV rays to be cured.

In the case of the UV irradiation, the irradiation dose of UV rays is preferably not less than 80 mJ/cm$^2$, more preferably not less than 100 mJ/cm$^2$, and still more preferably not less than 130 mJ/cm$^2$.

The optical layered body of the present invention preferably has a hardness of not less than HB and more preferably not less than H in a pencil hardness test (load of 4.9 N) in accordance to JIS K5600-5-4 (1999).

The optical layered body of the present invention preferably has a total luminous transmittance of not less than 80%. The total luminous transmittance of less than 80% may lower the color reproducibility and visibility as well as fail to achieve a desired contrast when such an optical layered body is installed in an image display device. The total luminous transmittance is more preferably not less than 90%.

The total luminous transmittance is determined using a haze meter (Produced by MURAKAMI COLOR RESEARCH LABORATORY, product No. HM-150) by a method in accordance with JIS K-7361.

The optical layered body of the present invention preferably has a haze of not more than 1%. The haze of more than 1% may fail to achieve a desired optical property and lower the visibility when the optical layered body of the present invention is installed in the image display screen.

The haze is determined using a haze meter (Produced by MURAKAMI COLOR RESEARCH LABORATORY, product No. HM-150) by a method in accordance with JIS K-7136.

Another aspect of the present invention is a polarizer including a polarizing element, in which the polarizing element has the optical layered body of the present invention on its surface by attaching the polyester base thereon or the like.

The polarizing element is not particularly limited, and examples thereof include a polyvinyl alcohol film, a polyvinyl formal film, a polyvinyl acetal film, and an ethylene-vinyl acetate copolymer saponified film which are colored by iodine and stretched. In lamination of the polarizing element and the hard coating film of the present invention, a light-transmitting base is preferably saponified. Saponification improves the adhesiveness.

In the polarizer of the present invention including the optical layered body of the present invention, the optical layered body is preferably arranged in such a manner that an angle formed by the slow axis of the polyester base and the absorption axis of a polarizing element mentioned later (polarizing element arranged on the view side of liquid crystal cells) is 0°±30° or 90°±30°. The angle formed by the slow axis of the polyester base and the absorption axis of the polarizing element in the above range greatly suppresses occurrence of rainbow interference pattern in images displayed on a liquid crystal display device including the polarizer of the present invention. The reason for this is not clarified but presumably as follows.

Namely, in the environment without external light or light of fluorescent lamps (hereinafter, such environment is also referred to as "dark place"), occurrence of rainbow interference pattern is suppressed regardless of the angle formed by the slow axis of the polyester base of the optical layered body of the present invention and the absorption axis of the polarizer. In the environment with external light or light of fluorescent lamps (hereinafter, such environment is also referred to as "bright place"), however, since the external light or light of fluorescent lamps does not necessarily have a continuous and wide spectrum, the display quality is lowered by occurrence of rainbow interference pattern when the angle formed by the slow axis of the polyester base and the absorption axis of the polarizing element is out of the above range.

In addition, since backlight passing through a color filter in the liquid crystal display device does not necessarily have a continuous and wide spectrum, the display quality is presumably lowered by occurrence of rainbow interference pattern when the angle formed by the slow axis of the polyester base and the absorption axis of the polarizing element is out of the above range.

The present invention also provides an image display device including the optical layered body or the polarizer. Examples of the image display device include LCDs, PDPs, FEDs, ELDs (organic or inorganic EL), CRTs, touch panels, electronic papers, and tablet PCs.

The LCD includes a transmissive display and a light source device irradiating the transmissive display from the back side. In the case where the image display device of the present invention is a LCD, the optical layered body or the polarizer of the present invention is formed on the surface of the transmissive display.

In the case where the present invention provides a liquid crystal display device including the optical layered body, the light source device irradiates the optical layered body with light from the bottom side (base side). In a STN liquid crystal display device, a retardation film may be sandwiched between a liquid crystal display element and the polarizer. An adhesive layer may be optionally provided between layers in the liquid crystal display device.

The PDP includes a front glass base and a rear glass base arranged to enclose discharge gas therebetween and oppose to each other. In the case where the image display device of the present invention is a PDP, the optical layered body is provided on the surface of the front glass base or the front plate (glass base or film base) thereof.

Other image display devices may include: an ELD device in which an illuminant emitting light with voltage application, such as zinc sulfide and diamines, is deposited on a glass base and the voltage applied to the base is controlled for displaying images; and a CRT in which an electric signal is converted to light to generate an image visible for human eyes. In such a case, the above optical layered body is provided on the surface of the display device or the surface of the front plate thereof.

The optical layered body of the present invention can be used, in any case, for displays of TVs and computers. Especially, the optical layered body of the present invention is favorably used for the surface of a display for high-definition images such as a liquid crystal panel, a PDP, an ELD, a touch panel, and an electric paper.

Particularly, the optical layered body of the present invention is favorably used for a touch panel. Another aspect of the present invention is a touch panel including the optical layered body of the present invention.

Namely, the touch panel of the present invention includes the optical layered body of the present invention and has an invisible electrode on the hard coat layer on the side opposite the primer layer side of the optical layered body.

Known modes of the touch panel include optical, ultrasonic, capacitance, resistive film modes in accordance with the position detection method.

In a resistive film-type touch panel, a transparent conductive film and a glass with a transparent conductive layer sandwich a spacer and are arranged to oppose to each other. The transparent conductive film is electrified and the voltage at the glass with a transparent conductive layer is measured. In contrast, a capacitance-type touch panel basically has a transparent conductive layer on a base and has no flexible part. Such a touch panel is used in a liquid crystal display, a display on a mobile phone, and an in-car display owing to its characteristics including high durability and high transmittance.

In the touch panel, a transparent conductive layer is sometimes patternized. However, patternization of the transparent conductive layer may clarify the difference in the refractive index between a patterned part and an unpatterned part, and the like because the material constituting the transparent conductive layer commonly has a high refractive index. In such a case, the patterned part is visible in a display screen to deteriorate the appearance as a display and to lower the visibility of the display screen.

Especially in the case of a capacitance-type touch panel, such an influence is strong because the transparent conductive layer is used on the entrance surface side. Accordingly, an invisible electrode is desired so that the pattern is not visible in a display screen even in the case when the transparent conductive layer is patternized.

The invisible electrode is an electrode in which optical functional layers are stacked so as not to allow the electrode pattern of the transparent conductive layer to be recognized from the display screen side. The invisible electrode has a configuration in which a high refractive layer, a low refractive layer, and a transparent conductive layer are stacked in the stated order. A combination of the refractive index and the film thickness of the high refractive layer and the low refractive layer within a later-described range allows invisualization of the invisible electrode having such a configuration. In addition, they are stacked on the surface on the display screen side of the hard coat layer in such a manner that the transparent conductive layer becomes a topmost surface.

The touch panel of the present invention has the invisible electrode, and is especially preferably a capacitance-type touch panel.

In the case where the optical layered body of the present invention has a configuration that the primer layer and the hard coat layer are formed on both faces of the polyester base, the touch panel of the present invention has the invisible electrode on at least one hard coat layer on the side opposite the primer layer side of the optical layered body. The touch panel having such a configuration is another aspect of the present invention.

FIG. 3 is a cross-sectional view schematically illustrating one example of the touch panel of the present invention.

In a touch panel 30 of the present invention illustrated in FIG. 3, the optical layered body of the present invention has primer layers 32 on both faces of a polyester base 31, and hard coat layers 33 respectively on the primer layers 32 on the side opposite the polyester base 31 side. Two optical layered bodies of the present invention are stacked via an adhesive layer 300 (hereinafter, the optical layered body of the display screen side is referred to as an upper optical layered body and the other optical layered body is referred to as a lower optical layered body). Additionally, the upper optical layered body and the lower optical layered body each have an invisible electrode 34 on the hard coat layer 33 on the display screen side. In the invisible electrode 34, a high refractive layer 35, a low refractive layer 36, and a transparent conductive layer 37 are stacked in the stated order starting from the hard coat layer 33 side.

In the touch panel 30 of the present invention, the hard coat layer 33 on the side opposite the display screen side of the upper optical layered body is stacked on the invisible electrode 34 of the lower optical layered body via the adhesive layer 300.

On the invisible electrode 34 stacked on the hard coat layer 33 on the side opposite the primer layer 32 of the upper optical layered body, a cover glass 39 is provided via an adhesive layer 38. The cover glass 39 constitutes a topmost surface.

FIG. 4 is a cross-sectional view schematically illustrating another example of the touch panel of the present invention.

As illustrated in FIG. 4, in a touch panel 40 of the present invention, primer layers 42 are formed on both faces of a polyester base 41, hard coat layers 43 are respectively formed on the primer layers 42 on the side opposite the polyester base 41 side, and invisible electrodes 44 are respectively formed on the hard coat layers 43 on the side opposite the primer layer 42 side. In the invisible electrode 44, a high refractive layer 45, a low refractive layer 46, and a transparent conductive layer 47 are stacked in the stated order starting from the hard coat layer 43 side. On the invisible electrode 44 on the display screen side, a cover glass 49 is provided via an adhesive layer 48. The cover glass 49 constitutes a topmost surface.

The adhesive layers 300, 38, and 48, and the cover glasses 39 and 49 illustrated in FIGS. 3 and 4 are not particularly limited, and known adhesive layers and cover glasses conventionally used in touch panels may be used. The cover glass may also be a plastic film.

The touch panels of the present invention illustrated in FIGS. 3 and 4 each include the optical layered body of the present invention in which the primer layer and the hard coat layer are formed on both faces of the polyester base. In the case where the optical layered body of the present invention has the primer layer and the hard coat layer formed on both faces of the polyester base, the configuration of the touch panel of the present invention is not limited to those illustrated in FIGS. 3 and 4.

The invisible electrode as mentioned above can be formed of coatings laminated, for example, by a gas phase method (CVD: chemical vapor deposition, PVD: Physical vapor deposition) or by a liquid phase method.

In the invisible electrode, preferably, the high refractive layer has a refractive index of 1.67 to 1.85 and a thickness of 20 to 80 nm, and the low refractive layer has a refractive index of 1.40 to 1.50 and a thickness of 20 to 80 nm. The refractive index and the thickness of the high refractive layer and the low refractive layer may be appropriately combined to realize invisualization of the transparent electrode layer. The high refractive index refers to a refractive index higher than that of the hard coat layer that is a layer under the high refractive layer. The low refractive index refers to a refractive index lower than that of the high refractive layer that is a layer under the low refractive layer.

In the case where the invisible electrode is formed by coatings laminated by a gas phase method, the high refractive layer may have a refractive index of 1.67 to 2.50.

In the case where the invisible electrode is formed of coatings laminated by a liquid phase method, though not particularly limited, the materials of the high refractive layer and the low refractive layer may be a composition in which high refractive- or low refractive ultrafine particles having an average primary particle size of 10 to 100 nm are uniformly dispersed in combination with additives such as organic solvents and dispersants in the binder component. The composition is applied by an appropriate method, dried, and cured (heat curing, UV curing, EB curing) to give the high refractive- or low refractive layer.

Alternatively, a compound in which a binder resin itself is a high refractive- or low refractive resin, without containing the high refractive ultrafine particles, may be used as the composition.

The binder component is not particularly limited, provided that it is a compound capable of maintaining a sufficient film strength (e.g. a compound having a group reactive with heat, UV, or EB). Examples of such a compound include: an acrylic compound having at least three polymerizable unsaturated bonds such as vinyl, acryloyl, and methacryloyl groups in a molecule; and a material curable by a sol-gel reaction. Examples of the material curable by a sol-gel reaction include a compound represented by $R'xSi(OR)_{4-x}$ (R: alkyl group, R': functional group having a polymerizable unsaturated bond such as a vinyl, acryloyl, or methacryloyl group at an end, x: substitution number satisfying 0<x<4), and a hydrolysate thereof.

The binder is preferably the same compound as the material of the hard coat layer mentioned above, and particularly preferably, for example, PETA, PETTA, DPPA, DPHA, TMPTA and the like which are three or more functional (meth)acrylate compounds.

The high refractive ultrafine particles are preferably metal oxide ultrafine particles which have a high refractive index and are colorless or almost not colored, and may be the material used for increasing the refractive index of the hard coat layer. In particular, preferably used are $TiO_2$ (refractive index of 2.71), $ZrO_2$ (refractive index of 2.10), $Nb_2O_5$ (refractive index of 2.33) and $Ta_2O_5$ (refractive index of 2.16). Especially, $ZrO_2$ particles and ATO particles are preferable because the pattern of the transparent conductive layer is invisualized and the coating film can have excellent transparency and durability.

The material of the low refractive layer may be the same as the material of the low refractive layer to be laminated in the case where the optical layered body of the present invention is an antiglare film.

The constituent material of the transparent conductive layer is not particularly limited, and may be a metal oxide of at least one metal selected from the group consisting of indium, tin, zinc, gallium, antimony, titanium, silicon, zirconium, magnesium, aluminum, gold, silver, copper, palladium, and tungsten. The metal oxide may optionally further contain a metal atom selected from the above group. For example, indium oxide containing tin oxide (ITO), tin oxide containing antimony (ATO), and the like are preferably used.

The thickness of the transparent conductive layer is not particularly limited. In terms of forming a continuous coating film having fine conductivity with a surface resistance of $1\times10^3 \Omega/\square$, a certain thickness is needed. However, excessively large thickness lowers the transparency. Accordingly, the lower limit of the thickness is preferably 15 nm and the upper limit thereof is preferably 45 nm. The lower limit is more preferably 20 nm and the upper limit is more preferably 30 nm. The thickness of less than 15 nm increases the surface electrical resistance and is less likely to form a continuous coating film. The thickness of more than 45 nm may problematically lower the transparency.

A method for forming the transparent conductive layer is not particularly limited, and a conventionally known method can be employed. Specific examples thereof include a vacuum deposition method, a sputtering method, and an ion plating method. In accordance with a required film thickness, an appropriate method may be employed.

After being formed on the low refractive layer, the transparent conductive layer may be annealed in a temperature range of 100° C. to 150° C. to be crystallized.

In the present invention, the transparent conductive layer is preferably etched to be patterned. The crystallized transparent conductive layer may be hardly etched. Accordingly, the transparent conductive layer is preferably annealed after patterning. Additionally, in the case where the high refractive layer and the low refractive layer are etched, the transparent conductive layer is preferably annealed after etching of the high refractive layer and the low refractive layer.

Advantageous Effects of Invention

The optical layered body of the present invention has the above configuration so that the adhesiveness between the polyester base and the hard coat layer is excellent, and occurrence of rainbow interference pattern and interference fringes in the images displayed on the liquid crystal display device is highly suppressed. Accordingly, the optical layered body of the present invention is suitably used for displays such as cathode ray tube displays (CRT), liquid crystal displays (LCD), plasma displays (PDP), electro luminescence displays (ELD), electric papers, and tablet PCs, especially for high-definition displays.

DESCRIPTION OF EMBODIMENTS

Figure 1:
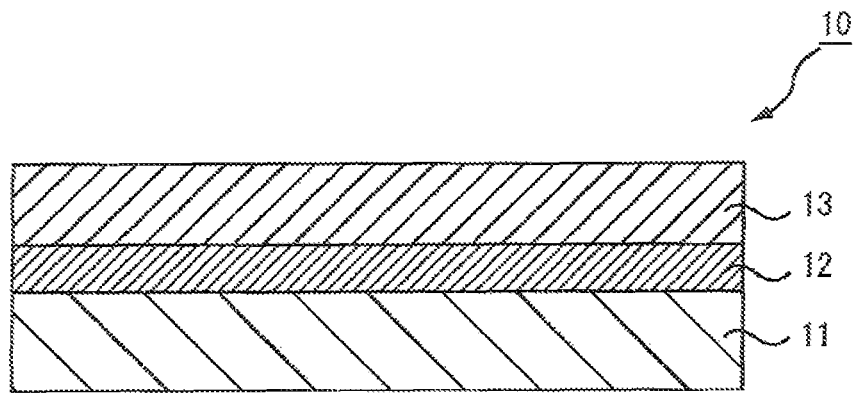
FIG. 1 is a cross-sectional view schematically illustrating one example of the optical layered body of the present invention.
Figure 2:
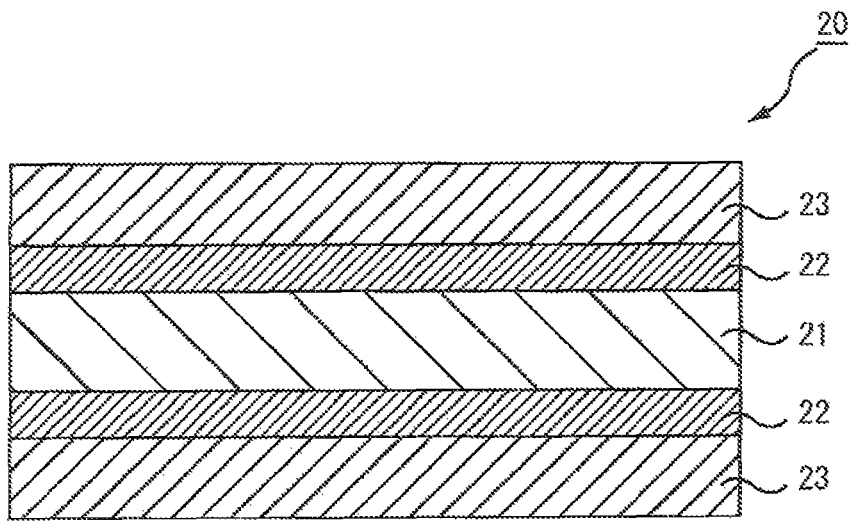
FIG. 2 is a cross-sectional view schematically illustrating another example of the optical layered body of the present invention.
Figure 3:
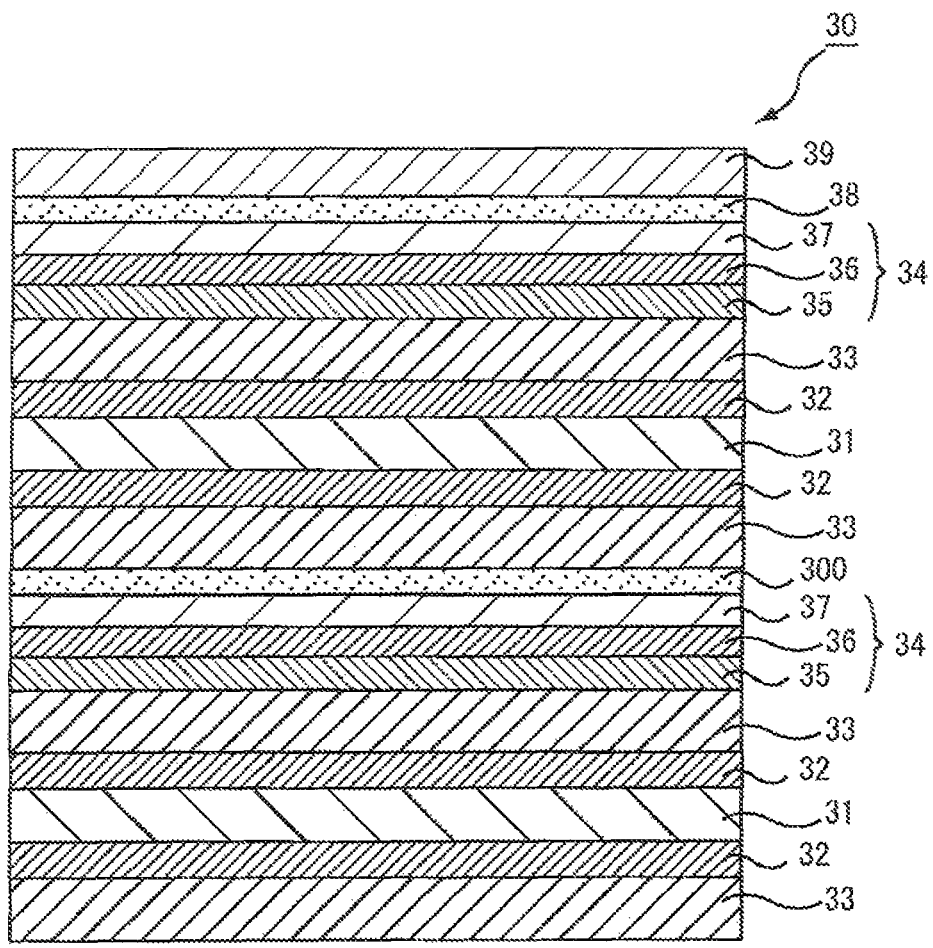
FIG. 3 is a cross-sectional view schematically illustrating one example of the touch panel of the present invention.
Figure 4:
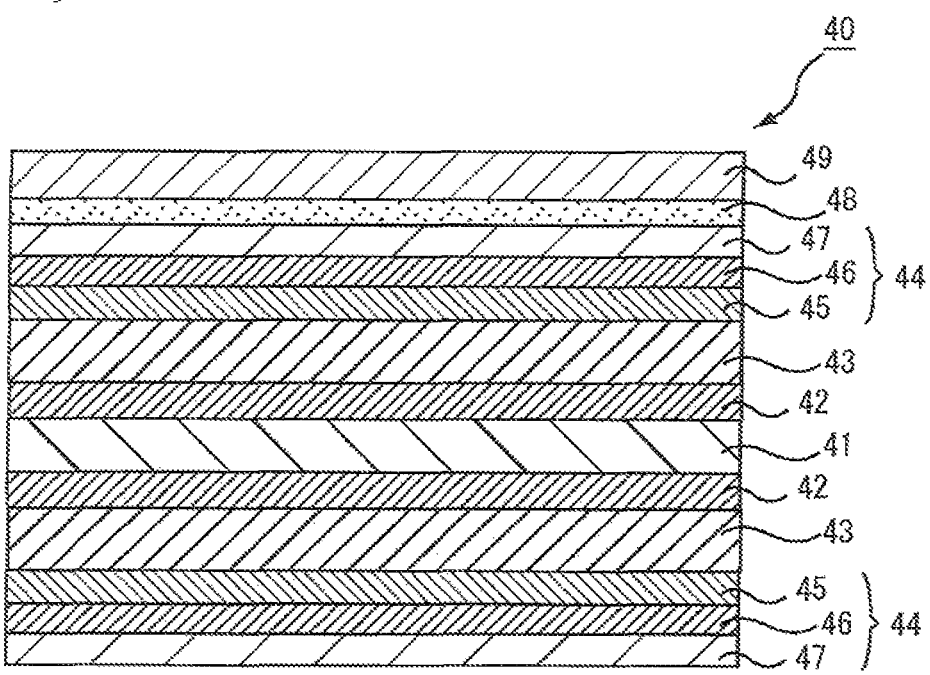
FIG. 4 is a cross-sectional view schematically illustrating another example of the touch panel of the present invention.

The present invention will be described by means of the following examples which are not intended to limit the scope of the present invention. Here, "parts" and "%" are based on mass unless otherwise stated.

The refractive indexes of the primer layer and the hard coat layer are each obtained as follows. The average refractive index (R) in a wavelength range of 380 to 780 nm was measured by using a spectro photometer (UV-3100PC produced by Shimazu Corporation). The value of the refractive index (n) was calculated based on the obtained average refractive index (R) by using the following equation:

$$R\ (\%) = (1-n)^2/(1+n)^2.$$

With regard to the primer layer and the hard coat layer, the material compositions thereof were each applied to a 50-μm PET without being subjected to a treatment for easy adhesion, to form a cured film with a thickness of 1 to 3 μm. To the face (backside) of the PET without being subjected to application, a black vinyl tape (e.g. Yamato vinyl tape No. 200-38-21, 38-mm width) with a width larger than a spot area for measurement was attached for preventing back surface reflection. Then, the average reflectance of each coating film was measured.

With regard to the refractive index of the polyester base, two polarizers were used to determine the alignment axis direction (direction of the main axis) of the polyester base. The refractive indexes (nx, ny) of two axes orthogonal to the alignment axis direction were obtained by using an Abbe refractometer (ATAGO CO., LTD., NAR-4T).

In examples, the refractive index was determined by the above method. In the case of the optical layered body, the Becke method may also be used for determination of the refractive index.

The thickness of the hard coat layer after being dried and cured can be determined simply by a cross-section observation, but here, the thickness of the hard coat layer is the average of the thicknesses at any 10 points measured with a Digimatic indicator IDF-130 produced by Mitsutoyo Corporation.

The thickness of the primer layer may be determined by a cross-section observation of the optical layered body by using a TEM image.

The materials used in examples and comparative examples are listed below.

Binder component (1): polyfunctional acrylate produced by NIPPON KAYAKU Co., Ltd., KAYARAD-PET-30 (product name, PETA (pentaerythritol triacrylate); trifunctional))

Binder component (2): polyfunctional oligomer produced by TOAGOSEI CO., LTD., Aronix M-9050 (product name, polyester acrylate, 3 or more functional, number average molecular weight of 4000 to 5000)

Binder component (3): LINC-3A (product name, fluorine monomer) produced by KYOEISHA CHEMICAL CO., LTD.

High refractive particle dispersion (1): water dispersion of $TiO_2$ fine particles produced by CIK Nano Tek Corporation, titanium oxide slurry (product name, dispersion with 20% solids)

High refractive particle dispersion (2): MEK dispersion of $ZrO_2$ fine particles produced by SUMITOMO OSAKA CEMENT Co., Ltd., MZ-230X (product name, dispersion with 30% solids)

Low refractive particles: MIBK dispersion of hollow silica fine particles (primary average particle size of 50 nm, solids content of 20%, void ratio of 40%)

Photopolymerization initiator (1): Irgacure 184 (product name) produced by BASF

Photopolymerization initiator (2): Irgacure 127 (product name) produced by BASF

Stain-proofing agent: X-22-164E (reactive silicone stain-proofing agent) produced by Shin-Etsu Chemical Co., Ltd.

Solvent (1): Methyl ethyl ketone (abbreviation: MEK)

Solvent (2): Toluene

Solvent (3): Cyclohexanone (abbreviation: Hanon)

Solvent (4): Methyl isobutyl ketone (abbreviation: MIBK)

(Preparation of a Composition for a Primer Layer, a Composition for a Hard Coat Layer, and a Composition for a Low Refractive Layer)

The following components were respectively mixed to prepare a composition for a primer layer, a composition for a hard coat layer, and a composition for a low refractive layer.

(Composition 1 for a Primer Layer)
Water dispersion of a polyester resin: 20.7 parts by mass
High refractive particle dispersion (1): 9.1 parts by mass
Water: 70.2 parts by mass (Composition 2 for a Primer Layer)
Water dispersion of a polyester resin: 28.0 parts by mass
Water: 72.0 parts by mass (Composition 1 for a Hard Coat Layer)
High refractive particle dispersion (2) MZ-230X: 58.8 parts by mass
Binder component (1) PET-30: 11.8 parts by mass
Solvent (4) MIBK: 28.8 parts by mass
Photopolymerization initiator (1) Irgacure 184: 0.6 parts by mass (Composition 2 for a Hard Coat Layer)
Binder component (1) PET-30: 5.7 parts by mass
Binder component (2) M-9050: 23.1 parts by mass
Solvent (4) MIBK: 70.0 parts by mass Photopolymerization initiator (1) Irgacure 184: 1.2 parts by mass
(Composition 3 for a Hard Coat Layer)
High refractive particle dispersion (2) MZ-230X: 48.8 parts by mass
Binder component (1) PET-30: 14.6 parts by mass
Solvent (4) MIBK: 35.9 parts by mass
Photopolymerization initiator (1) Irgacure 184: 0.7 parts by mass
(Composition for a Low Refractive Layer)
Hollow silica particle dispersion: 15.0 parts by mass
Binder component (1) PET-30: 1.0 part by mass
Binder component (3) LINC-3A: 1.0 part by mass
Solvent (4) MIBK: 83.0 parts by mass
Photopolymerization initiator (2) Irgacure 127: 0.1 parts by mass
Stain-proofing agent X-22-164E: 0.05 parts by mass
(Composition for a High Refractive Layer for Invisualization)
High refractive particle dispersion (2) MZ-230X: 11.0 parts by mass
Binder component (1) PET-30: 1.6 parts by mass
Solvent (4) MIBK: 87.3 parts by mass
Photopolymerization initiator (2) Irgacure 127: 0.1 parts by mass
(Composition for a Low Refractive Layer for Invisualization)
Binder component (1) PET-30: 0.6 parts by mass
Binder component (3) LINC-3A: 2.2 parts by mass
Solvent (4) MIBK: 97.0 parts by mass
Photopolymerization initiator (2) Irgacure 127: 0.2 parts by mass
Stain-proofing agent X-22-164E: 0.01 parts by mass

EXAMPLE 1

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 4.5 times using a biaxial film stretching tester (TOYO SEIKI SEISAKU-SHO LTD.). Then, the composition 1 for a primer layer was uniformly applied to both faces of the stretched film with a roll coater.

Next, the resulting film was dried at 95° C. and stretched by 1.5 times in a direction at 90 degrees to the stretching direction. As a result, a polyester base (retardation of 10000 nm, film thickness of 100 μm, nx of 1.70, ny of 1.60, Δn of 0.10) was obtained. The primer layer had a refractive index of 1.65 and a film thickness of 100 nm.

To the formed primer layer, the composition 1 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured. In this manner, an optical layered body was produced.

The hard coat layer had a refractive index of 1.65.

EXAMPLE 2

An optical layered body was produced in the same manner as in Example 1 except that the composition 3 for a hard coat layer was used instead of the composition 1 for a hard coat layer. The hard coat layer had a refractive index of 1.61.

EXAMPLE 3

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 5.2 times using a biaxial film stretching tester (TOYO SEIKI SEISAKU-SHO LTD.). Then, the composition 2 for a primer layer was uniformly applied to both faces of the stretched film with a roll coater.

Next, the resulting film was dried at 95° C. and stretched by 1.2 times in a direction at 90 degrees to the stretching direction. As a result, a polyester base (retardation of 9000 nm, film thickness of 60 μm, nx of 1.73, ny of 1.58, Δn of 0.15) was obtained. The primer layer had a refractive index of 1.57 and a film thickness of 20 nm.

To the formed primer layer, the composition 1 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured. In this manner, an optical layered body was produced.

The hard coat layer had a refractive index of 1.65.

EXAMPLE 4

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 3.5 times using a biaxial film stretching tester (TOYO SEIKI SEISAKU-SHO LTD.). Then, the composition 1 for a primer layer was uniformly applied to both faces of the stretched film with a roll coater.

Next, the resulting film was dried at 95° C. and stretched by 1.5 times in a direction at 90 degrees to the stretching direction. As a result, a polyester base (retardation of 8750 nm, film thickness of 125 μm, nx of 1.685, ny of 1.615, Δn of 0.07) was obtained. The primer layer had a refractive index of 1.65 and a film thickness of 300 nm.

To the formed primer layer, the composition 1 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured. In this manner, an optical layered body was produced.

The hard coat layer had a refractive index of 1.65.

EXAMPLE 5

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 5.2 times using a biaxial film stretching tester (TOYO SEIKI SEISAKU-SHO LTD.). Then, the composition 1 for a primer layer was uniformly applied to both faces of the stretched film with a roll coater.

Next, the resulting film was dried at 95° C. and stretched by 1.2 times in a direction at 90 degrees to the stretching direction. As a result, a polyester base (retardation of 9000 nm, film thickness of 60 μm, nx of 1.73, ny of 1.58, Δn of 0.15) was obtained. The primer layer had a refractive index of 1.65 and a film thickness of 300 nm.

To the formed primer layer, the composition 1 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured. In this manner, an optical layered body was produced.

The hard coat layer had a refractive index of 1.65.

EXAMPLE 6

An optical layered body was produced in the same manner as in Example 1 except that the composition 2 for a hard coat layer was used instead of the composition 1 for a hard coat layer.

The polyester base had a retardation of 10000 nm, a film thickness of 100 μm, nx of 1.70, ny of 1.60, and Δn of 0.10. The primer layer had a refractive index of 1.57 and a film thickness of 20 nm. The hard coat layer had a refractive index of 1.65.

EXAMPLE 7

An optical layered body was produced in the same manner as in Example 6 except that the composition 3 for a hard coat layer was used instead of the composition 1 for a hard coat layer and the primer layer was made to have a thickness of 10 nm. The hard coat layer had a refractive index of 1.61.

EXAMPLE 8

Under the same conditions as in Example 6, a polyester base, a primer layer, and a hard coat layer were formed. To the hard coat layer, a composition for a low refractive layer was applied with a bar coater to form a coating film. The coating film was dried and irradiated with UV rays in the same manner as in the case of the hard coat layer to form a low refractive layer having a thickness of 100 nm after being dried and cured. In this manner, an optical layered body having a low refractive layer was produced.

EXAMPLE 9

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 3.5 times using a biaxial film stretching tester (TOYO SEIKI SEISAKU-SHO LTD.). Then, the composition 2 for a primer layer was uniformly applied to both faces of the stretched film with a roll coater.

Next, the resulting film was dried at 95° C. and stretched by 1.5 times in a direction at 90 degrees to the stretching direction. As a result, a polyester base (retardation of 8750 nm, film thickness of 125 μm, nx of 1.685, ny of 1.615, Δn of 0.07) was obtained. The primer layer had a refractive index of 1.57 and a film thickness of 20 nm.

To the formed primer layer, the composition 1 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured.

In this manner, an optical layered body was produced. The hard coat layer had a refractive index of 1.65.

EXAMPLE 10

An optical layered body was produced in the same manner as in Example 1 except that the composition 2 for a hard coat layer was used instead of the composition 1 for a hard coat layer.

The polyester base had a retardation of 10000 nm, a film thickness of 100 μm, nx of 1.70, ny of 1.60, and Δn of 0.10. The primer layer had a refractive index of 1.57 and a film thickness of 3 nm. The hard coat layer had a refractive index of 1.65.

EXAMPLE 11

An optical layered body was produced in the same manner as in Example 1 except that the composition 2 for a hard coat layer was used instead of the composition 1 for a hard coat layer.

The polyester base had a retardation of 10000 nm, a film thickness of 100 μm, nx of 1.70, ny of 1.60, and Δn of 0.10. The primer layer had a refractive index of 1.57 and a film thickness of 30 nm. The hard coat layer had a refractive index of 1.65.

COMPARATIVE EXAMPLE 1

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 4.5 times using a biaxial film stretching tester (TOYO SEIKI SEISAKU-SHO LTD.) at 120° C. Then, the composition 2 for a primer layer was uniformly applied to both faces of the stretched film with a roll coater.

Next, the resulting film was dried at 95° C. and stretched by 1.5 times in a direction at 90 degrees to the stretching direction. As a result, a polyester base (retardation of 10000 nm, film thickness of 100 μm, nx of 1.70, ny of 1.60, Δn of 0.10) was obtained. The primer layer had a refractive index of 1.57 and a film thickness of 100 nm.

Then, under the same conditions as in Example 1, a hard coat layer was formed. In this manner, an optical layered body was produced. The hard coat layer had a refractive index of 1.65.

COMPARATIVE EXAMPLE 2

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 120° C. for a minute, and then stretched by 4.5 times using a biaxial film stretching tester (TOYO SEIKI SEISAKU-SHO LTD.). Then, the composition 2 for a primer layer was uniformly applied to both faces of the stretched film with a roll coater.

Next, the resulting film was dried at 95° C. and stretched by 1.5 times in a direction at 90 degrees to the stretching direction. As a result, a polyester base (retardation of 10000 nm, film thickness of 100 μm, nx of 1.70, ny of 1.60, Δn of 0.10) was obtained. The primer layer had a refractive index of 1.57 and a film thickness of 20 nm.

To the formed primer layer, the composition 2 for a hard coat layer was applied with a bar coater. The applied composition was dried at 70° C. for a minute, and a solvent therein was removed. Accordingly, a coating film was formed.

The coating film was then irradiated with UV rays at 150 mJ/cm$^2$ using a UV irradiation device (produced by Fusion UV Systems Japan K.K., H valve (product name)) to give a hard coat layer having a thickness of 6.0 μm after being dried and cured. In this manner, an optical layered body was produced. The hard coat layer had a refractive index of 1.52.

COMPARATIVE EXAMPLE 3

A primer layer and a hard coat layer were formed under the same conditions as in Examples 1 except that a PET film "A4100" (retardation of 6200 nm, film thickness of 188 μm, Δn of 0.033) produced by TOYOBO Co., LTD. was used as a polyester base. The hard coat layer had a refractive index of 1.65.

COMPARATIVE EXAMPLE 4

Melting polyethylene terephthalate was molten at 290° C. and extruded into a sheet-shaped film through a film-forming dye. The film was made in contact with a rotational quenching drum chilled with water for cooling purposes, so that an unstretched film was produced.

The unstretched film was preheated at 150° C. for a minute, and then stretched by 8.0 times using a biaxial film stretching tester (TOYO SEIKI SEISAKU-SHO LTD.) at 150° C. Then, the composition 1 for a primer layer was uniformly applied to both faces of the stretched film with a roll coater.

Next, the resulting film was dried at 95° C. and stretched by 1.0 time in a direction at 90 degrees to the stretching direction. As a result, a polyester base (retardation of 12500 nm, film thickness of 50 μm, nx of 1.80, ny of 1.55, Δn of 0.025) was obtained.

However, the base produced under the above conditions had cracks and breaks in the film to be unpractical. A composition for a hard coat layer could not be applied to such a base, so that evaluation could not be performed.

COMPARATIVE EXAMPLE 5

An optical layered body was produced under the same conditions as in Example 7 except that the film thickness of the primer layer was set to 40 nm.

COMPARATIVE EXAMPLE 6

An optical layered body was produced under the same conditions as in Example 7 except that the film thickness of the primer layer was set to 1 nm.

The optical layered bodies obtained in the examples and the comparative examples were evaluated as follows. Table 1 shows the results.

(Rainbow Interference Pattern)

Each of the optical layered bodies produced in the examples and the comparative examples was placed on a polarizing element on the viewer side in a liquid crystal monitor (FLATORON IPS226V produced by LG Electronics Japan) to produce a liquid crystal display device. The optical layered body was placed in such a manner that an angle formed by the slow axis of the polyester base and the absorption axis of the polarizing element on the viewer side in the liquid crystal monitor was 0°.

The displayed image was observed visually and over polarizing sunglasses from the front and in an oblique direction (about 50 degrees) in a dark place and in a bright place (400 lx around the liquid crystal monitor) for determination of the presence or absence of rainbow interference pattern based on the following criteria. The observation over polarizing sunglasses is a highly severe evaluation method compared to visual observation. The observation was performed by 10 persons, and the most common evaluation was determined as the result.

Excellent: No rainbow interference pattern was present in the observation over polarizing sunglasses.

Good: Slight rainbow interference pattern was present in the observation over polarizing sunglasses, but no rainbow interference pattern was present in the visual observation. No problem in practical use.

Average: rainbow interference pattern was present in the observation over polarizing sunglasses, and slight rainbow interference pattern was present in the visual observation.

Poor: Clear rainbow interference pattern was present in the observation over polarizing sunglasses, and rainbow interference pattern was present in the visual observation.

(Interference Fringes)

Presence of interference fringes was visually checked by using an interference fringe testing lamp (Na lamp) produced by Funatech Co., Ltd. The evaluation was performed based on the following criteria. The surface opposite the coated surface of the sample was painted with black ink, and the coated surface was exposed to the interference fringe testing lamp for reflective observation.

Excellent: No interference fringes were observed.

Good: Only slight interference fringes were observed. No problem in practical use.

Average: faint interference fringes were observed.

Poor: Clear interference fringes were observed.

(Adhesion)

Adhesiveness was measured by a cross-cut adhesion test mentioned below.

(Cross-Cut Adhesion Test)

On the coated surface side of the optical layered body, a grid pattern (1 mm square, 100 boxes in total) was etched. Repetitive peeling test (5 times) was performed using an industrial Cellotape® (24 mm width) produced by NICHIBAN CO., LTD. The ratio of the unpeeled boxes calculated based on the following criteria was obtained.

Adhesiveness (%)={the number of unpeeled boxes/the total number of boxes (100)}×100

Good: Adhesiveness of not less than 90%
Poor: Adhesiveness of less than 90%
(Reflectance)

The surface opposite the processed surface of the sample was covered with a black vinyl tape (e.g. Yamato vinyl tape No. 200-38-21, 38 mm width) for preventing back reflection. The reflectance of the sample was measured by using an ultraviolet and visible spectrophotometer (V7100 type (product name) produced by JASCO Corporation) and an absolute reflectance measuring device (VAR-7010 (product name) produced by JASCO Corporation) under the conditions that the incident angle was 5°, an N-polarized polarizing element, and a measurement wavelength range of 380 to 780 nm. The average of the measurements obtained in the above wavelength range was determined as the reflectance. The reflectance of the optical layered body including the low refractive layer was measured.

TABLE 1

| | Rainbow interference pattern | Interference fringes | Adhesiveness | Reflectance (%) |
|---|---|---|---|---|
| Example 1 | Excellent | Excellent | Good | — |
| Example 2 | Excellent | Excellent | Good | — |
| Example 3 | Excellent | Excellent | Good | — |
| Example 4 | Good | Excellent | Good | — |
| Example 5 | Excellent | Excellent | Good | — |
| Example 6 | Excellent | Excellent | Good | — |
| Example 7 | Excellent | Good | Good | — |
| Example 8 | Excellent | Excellent | Good | 0.7 |
| Example 9 | Good | Excellent | Good | — |
| Example 10 | Excellent | Excellent | Good | — |
| Example 11 | Excellent | Good | Good | — |
| Comparative Example 1 | Excellent | Poor | Good | — |
| Comparative Example 2 | Excellent | Poor | Good | — |
| Comparative Example 3 | Poor | Excellent | Good | — |
| Comparative Example 4 | — | — | — | — |
| Comparative Example 5 | Excellent | Poor | Good | — |
| Comparative Example 6 | Excellent | Excellent | Poor | — |

As clearly seen in Table 1, the optical layered bodies of Example 1 to 11 are highly evaluated in terms of rainbow interference pattern, favorably suppress interference fringes, and have excellent adhesiveness. In Example 7, the evaluation result in terms of interference fringes was slightly lower because the difference (nh−ny) between the refractive index (nh) of the hard coat layer and the refractive index (ny) in the fast axis direction of the polyester base was as small as 0.01. In Example 8, a low refractive layer controlling the refractive index was stacked, so that the anti-reflection properties were excellent. In Examples 4 and 9, the evaluation results in terms of rainbow interference pattern were slightly lower because the retardation of the polyester bases was 8750 nm which was smaller than that in other examples. In Example 11, the primer layer was thicker (30 nm) compared to the primer layer of Example 10 (3 nm), and such a thick primer layer adversely affected prevention of interference fringes so that the evaluation results in terms of the interference fringes was a bit lower. Though the optical layered bodies of Comparative Examples 1 and 2 were highly evaluated in terms of rainbow interference pattern, interference fringes were observed therein. In the optical layered body of Comparative Example 3, though interference fringes were suppressed, rainbow interference pattern was clearly observed. The polyester base of Comparative Example 4 was impractical because of cracks and breaks in the base itself. In Comparative Example 5, the thickness of the primer layer was out of the range of the present invention, and the interference fringes were observed. In Comparative Example 6, the primer layer was thin to be poor in adhesiveness.

REFERENCE EXAMPLE 1

An optical layered body in which a hard coat layer with a refractive index of 1.65 was stacked was produced in the same manner as in Example 1 except that the irradiation amount of UV rays on the coating film of the composition for a hard coat layer was changed to 50 mJ/cm$^2$.

On the hard coat layer, a composition for a high refractive layer for invisualization was applied with a bar coater. The coating film was dried at 60° C. for a minute to remove the solvent therein. The coating film was then irradiated with UV rays at 50 mJ/cm$^2$ using an H valve (product name) produced by Fusion UV Systems Japan K.K. to give a high refractive layer having a thickness of 45 nm after being dried and cured with a refractive index of 1.70.

On the high refractive layer, a composition for a low refractive layer for invisualization was applied with a bar coater. The coating film was dried at 60° C. for a minute to remove the solvent therein. The coating film was then irradiated with UV rays at 100 mJ/cm$^2$ using an H valve (product name) produced by Fusion UV Systems Japan K.K. to give a low refractive layer having a thickness of 45 nm after being dried and cured with a refractive index of 1.46.

On the low refractive layer, an ITO film (refractive index of 1.95) having a thickness of 30 nm was formed by reactive sputtering using a sintered material containing 97% by weight of indium oxide and 3% by weight of tin oxide under a 0.4 Pa atmosphere containing 97% of argon gas and 3% of oxygen gas. The resulting layer was used as a transparent conductive layer, so that an invisible electrode was formed.

(Patternization of an ITO Film by Etching)

To the obtained transparent conductive layer, a photo resist patternized into a stripe pattern was applied. The photo resist was dried and cured, and then, immersed in a 5% hydrochloric acid (hydrogen chloride aqueous solution) at 25° C. for a minute. After etching of the ITO film, the photo resist was removed.

(Crystallization of a Transparent Conductive Layer by Annealing)

After patterning of the ITO film, the optical layered body was subjected to a heat treatment at 140° C. for 90 minutes for crystallization of the ITO film.

This treatment provides fine properties such as chemical resistance.

Accordingly, an optical layered body having a patternized invisible electrode was obtained.

REFERENCE EXAMPLE 2

An optical layered body in which a hard coat layer was stacked was produced in the same manner as in Example 1.

On the hard coat layer, only a transparent conductive layer including an ITO film was formed in the same manner as in Reference Example 1. Then, patternization of the ITO film by etching and crystallization of the transparent conductive layer were performed so that an optical layered body having a transparent conductive layer was obtained.

(Evaluation of Invisibility of the Electrode)

Invisualization states of the transparent conductive layers of the optical layered bodies of the reference examples were visually observed.

The pattern of the transparent conductive layer may be visible in a bright room with fluorescent lamps when the display is in the off-state (reflected light makes the pattern visible when the display shows a black screen) and when the display is in the on-state (transmitted light makes the pattern visible when the display shows a white screen). Therefore, the invisibility was double-checked in both states.

(Evaluation Method)

(1) Reflected Light Evaluation

In a room with a fluorescent lamp (32W FHF32EX-n •NU produced by Panasonic Corporation), the optical layered body was placed on a black board in such a manner that the transparent conductive layer side thereof faced upward (at a position 1.5 m distant from the fluorescent lamp). The reflected light was visually observed from a position 30 cm distant from the optical layered body, so that the optical layered body was evaluated for whether or not the patterned part and the non-patterned part were invisualized.

(2) Transmitted Light Evaluation

In a room with a fluorescent lamp (32W FHF32EX-n•NU produced by Panasonic Corporation), the optical layered body was placed in such a manner as to allow observation of the fluorescent lamp through the optical layered body, at a position 1.5 m distant from the fluorescent lamp. The light transmitting the optical layered body was visually observed, and the optical layered body was evaluated for whether or not the patterned part and the non-patterned part were invisualized. The evaluation was conducted based on the following criteria.

Good: The patterned part and the non-patterned part were not visually observed in both evaluations (1) and (2), providing invisualization.

Poor: The patterned part and the non-patterned part were clearly distinguished from each other in one or both of the evaluations (1) and (2).

As a result, in the optical layered body according to Reference Example 1, the invisible electrode appropriately worked, leading to the evaluation result "Good". However, since the optical layered body according to Reference Example 2 did not have an invisible electrode structure, the pattern of the transparent conductive layer was clearly observed, leading to the evaluation result "Poor".

Industrial Applicability

The optical layered body of the present invention is suitably used for displays such as cathode ray tube displays (CRT), liquid crystal displays (LCD), plasma displays (PDP), electro luminescence displays (ELD), touch panels, electric papers, and tablet PCs, especially for high-definition displays.

REFERENCE SIGNS LIST

| | |
|---|---|
| 10, 20: | Optical layered body |
| 11, 21, 31, 41: | Polyester base |
| 12, 22, 32, 42: | Primer layer |
| 13, 23, 33, 43: | Hard coat layer |
| 30, 40: | Touch panel |
| 34, 44: | Invisible electrode |
| 35, 45: | High refractive layer |
| 36, 46: | Low refractive layer |
| 37, 47: | Transparent conductive layer |
| 38, 48, 300: | Adhesive layer |
| 39, 49: | Cover glass |

The invention claimed is:

1. An optical layered body comprising:
a polyester base,
a primer layer formed on the polyester base, and
a hard coat layer formed on the primer layer,
wherein
the polyester base has a retardation of not less than 8000 nm, and a difference (nx−ny) of 0.07 to 0.20 between a refractive index (nx) in a slow axis direction that is a high refractive index direction and a refractive index (ny) of a fast axis direction that is orthogonal to the slow axis direction,
a refractive index (np) of the primer layer, the refractive index (nx) in the slow axis direction of the polyester base, and the refractive index (ny) in the fast axis direction of the polyester base satisfy ny<np<nx, and
a refractive index (nh) of the hard coat layer, the refractive index (nx) in the slow axis direction of the polyester base, and the refractive index (ny) in the fast axis direction of the polyester base satisfy ny<nh<nx.

2. A polarizer comprising a polarizing element,
wherein
the polarizer further includes the optical layered body according to claim 1, on a surface of the polarizing element.

3. An image display device comprising the optical layered body according to claim 1, or the polarizer according to claim 2.

4. The optical layered body according to claim 1,
wherein
the primer layer and the hard coat layer are formed on both surfaces of the polyester base.

5. A touch panel comprising the optical layered body according to claim 4,
wherein
an invisible electrode is provided on at least one hard coat layer of the optical layered body on a side opposite the side covered with the primer layer.

6. A touch panel comprising the optical layered body according to claim 1,
wherein
an invisible electrode is provided on a surface of the hard coat layer of the optical layered body on a side opposite the side covered with the primer layer.

7. An optical layered body comprising:
a polyester base;
a primer layer formed on the polyester base; and
a hard coat layer formed on the primer layer,
wherein
the polyester base has a retardation of not less than 8000 nm, and a difference (nx−ny) of 0.07 to 0.20 between a refractive index (nx) in a slow axis direction that is a high refractive index direction and a refractive index (ny) of a fast axis direction that is orthogonal to the slow axis direction,
the primer layer has a thickness of 3 to 30 nm,
a refractive index (nh) of the hard coat layer, the refractive index (nx) in the slow axis direction of the polyester base, and the refractive index (ny) in the fast axis direction of the polyester base satisfy ny<nh<nx.

8. The optical layered body according to claim 7, wherein
the refractive index (ny) in the fast axis direction of the polyester base and a refractive index (np) of the primer layer satisfy ny>np.

9. The optical layered body according to claim 8, wherein
a difference (ny−np) between the refractive index (ny) in the fast axis direction of the polyester base and the refractive index (np) of the primer layer is not more than 0.05.

10. The optical layered body according to claim 9, wherein a difference (nx −nh) between the refractive index (nx) in the slow axis direction of the polyester base and the refractive index (nh) of the hard coat layer and a difference (nh−ny) of the refractive index (nh) of the hard coat layer and the refractive index (ny) in the fast axis direction of the polyester base are both not less than 0.025.

11. The optical layered body according to claim 9, wherein the primer layer and the hard coat layer are formed on both surfaces of the polyester base.

12. A polarizer comprising a polarizing element, wherein the polarizer further includes the optical layered body according to claim 9 on a surface of the polarizing element.

13. The optical layered body according to claim 8, wherein a difference (nx −nh) between the refractive index (nx) in the slow axis direction of the polyester base and the refractive index (nh) of the hard coat layer and a difference (nh−ny) of the refractive index (nh) of the hard coat layer and the refractive index (ny) in the fast axis direction of the polyester base are both not less than 0.025.

14. The optical layered body according to claim 8, wherein the primer layer and the hard coat layer are formed on both surfaces of the polyester base.

15. A polarizer comprising a polarizing element, wherein the polarizer further includes the optical layered body according to claim 8 on a surface of the polarizing element.

16. The optical layered body according to claim 7, wherein a difference (nx−nh) between the refractive index (nx) in the slow axis direction of the polyester base and the refractive index (nh) of the hard coat layer and a difference (nh−ny) of the refractive index (nh) of the hard coat layer and the refractive index (ny) in the fast axis direction of the polyester base are both not less than 0.025.

17. The optical layered body according to claim 16, wherein the primer layer and the hard coat layer are formed on both surfaces of the polyester base.

18. A polarizer comprising a polarizing element, wherein the polarizer further includes the optical layered body according to claim 16 on a surface of the polarizing element.

19. The optical layered body according to claim 7, wherein the primer layer and the hard coat layer are formed on both surfaces of the polyester base.

20. A polarizer comprising a polarizing element, wherein the polarizer further includes the optical layered body according to claim 7 on a surface of the polarizing element.

* * * * *